US007433594B2

(12) United States Patent
Takachio et al.

(10) Patent No.: US 7,433,594 B2
(45) Date of Patent: *Oct. 7, 2008

(54) NODE APPARATUS, OPTICAL WAVELENGTH DIVISION MULTIPLEXING NETWORK, AND SYSTEM SWITCHING METHOD

(75) Inventors: Noboru Takachio, Yokosuka (JP);
Katsumi Iwatsuki, Yokosuka (JP);
Hitoshi Obara, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/580,568

(22) Filed: Oct. 12, 2006

(65) Prior Publication Data

US 2007/0031146 A1 Feb. 8, 2007

Related U.S. Application Data

(62) Division of application No. 09/785,402, filed on Feb. 20, 2001, now Pat. No. 7,164,861.

(30) Foreign Application Priority Data

Feb. 21, 2000 (JP) ............................. 2000-043293
Aug. 8, 2000 (JP) ............................. 2000-240232

(51) Int. Cl.
*H04B 10/00* (2006.01)
(52) U.S. Cl. .................. 398/4; 398/5; 398/48; 398/58; 398/59; 398/63; 398/68; 398/70
(58) Field of Classification Search ..................... 398/1, 398/4, 9, 30, 43–79, 83, 115, 119, 5
See application file for complete search history.

(56) References Cited

U.S. PATENT DOCUMENTS 5,572,357 A * 11/1996 Nakazato et al. ......... 359/341.33

(Continued)

FOREIGN PATENT DOCUMENTS

EP 0837572 A2 4/1998

(Continued)

OTHER PUBLICATIONS

Wagner et al: "Multiwavelength Ring Networks for Switch Consolidation and Interconnection", IEEE SUPERCOMM/ICC '92, Jun. 14-18, 1992, pp. 1173-1179.*

(Continued)

*Primary Examiner*—Kenneth Vanderpuye
*Assistant Examiner*—Li Liu
(74) *Attorney, Agent, or Firm*—Thelen Reid Brown Raysman & Steiner LLP

(57) ABSTRACT

An optical wavelength division multiplexing network has a multi-level structure where a plurality of optical network units (ONUs) are connected to a lowest-level network. A node apparatus connected to networks other than the lowest-level network includes (a) passive optical components to branch optical signals from a higher-level network to a lower-level network, and couple optical signals from the lower-level network to the higher-level network, and (b) optical amplifiers for the optical signals. A node apparatus connected to the lowest-level network includes (a) an optical multiplexer/de-multiplexer to de-multiplex optical signals from the higher-level network, selectively output an optical signal to each ONU, and multiplex wave-length specific optical signals from the ONUs into a multiplexed optical signal, and (b) optical amplifiers for the optical signals. The node apparatuses provide an optical communication path between the higher-level network and the lower-level (or lowest-level) network without converting the optical signals into electrical signals.

6 Claims, 28 Drawing Sheets

U.S. PATENT DOCUMENTS

| | | | | |
|---|---|---|---|---|
| 5,680,235 | A | | 10/1997 | Johansson .................... 359/110 |
| 5,745,269 | A | | 4/1998 | Chawki et al. ............... 359/119 |
| 5,953,141 | A | * | 9/1999 | Liu et al. ....................... 398/83 |
| 6,137,603 | A | * | 10/2000 | Henmi ........................... 398/4 |
| 6,147,786 | A | * | 11/2000 | Pan ................................. 398/1 |
| 6,192,058 | B1 | * | 2/2001 | Abeles ........................... 372/6 |
| 6,246,810 | B1 | * | 6/2001 | Harris et al. ................... 385/26 |
| 6,400,476 | B1 | * | 6/2002 | Arecco ........................... 398/9 |
| 6,580,851 | B1 | * | 6/2003 | Vahala et al. ................. 385/30 |
| 6,590,681 | B1 | * | 7/2003 | Egnell et al. ................... 398/82 |
| H2075 | H | * | 8/2003 | Gnauck et al. ................. 398/58 |
| 6,657,952 | B1 | * | 12/2003 | Shiragaki et al. ............. 370/223 |
| 6,763,195 | B1 | * | 7/2004 | Willebrand et al. ......... 398/115 |
| 6,788,898 | B1 | * | 9/2004 | Britz et al. ..................... 398/70 |
| 6,895,186 | B2 | * | 5/2005 | Stern ............................ 398/83 |
| 7,106,969 | B1 | * | 9/2006 | Lichtman et al. .............. 398/59 |

FOREIGN PATENT DOCUMENTS

| | | |
|---|---|---|
| EP | 0837572 A3 | 10/2003 |
| FR | 2756442 | 5/1998 |
| JP | 06-104845 | 4/1994 |
| JP | 07-231305 | 8/1995 |
| JP | 09-153907 | 6/1997 |
| JP | 2000-036828 | 2/2000 |

OTHER PUBLICATIONS

European Search Report, EP01400447.7—2415, Dec. 22, 2005.

Search Report, 01400447.7—2415 PCT/, Oct. 5, 2005.

Manchester, J. et al., "The Evolution of Transport Nework Survivability", IEEE Communications Magazine, IEEE Service Center, Piscataway, N.J., US, vol. 37, No. 8, (Aug. 1999), pp. 44-51.

Baack, C., "Entwicklungstendenzen Photonischer Nachrichtennetze. Trends of Photonic Communications Networks", Frequenz, Schiele Und Schon, Berlin, DE, vol. 50, No. 9/10, (Sep. 1996), pp. 192-197.

Handley, M.R. et al., "A Comparison of WDM PON Architectures", Proceedings of the European Conference on Networks and Optical Communications 1999. NOC '99. Broadband access and Technology, vol. Part 1, 1999, pp. 141-147.

Koonen, Ton et al., "Tobasco: An Innovative Approach For Upgrading CATV Fiber-Coax Networks For Broadband Interactive Services", IEEE Communication Magazine, IEEE Service Center, Piscataway, N.J., US, vol. 35, No. 4, (Apr. 1997), pp. 76-81.

Pfeiffer, et al., "TDM/CDM/WDM Approach for Metro Networks with 200 Optical Channels", vol. IV, pp. 77-78, 8.1.2, Sep. 4, 2000.

Lannone, et al., "A Flexible Metro WDM Ring Using Wavelength-Independent subscriber Equipment to Share Bandwidth", (2000), 3 pages.

* cited by examiner

FIG. 14

EXAMPLE OF RELATIONSHIP BETWEEN INPUT/OUTPUT PORTS AND AWG WAVELENGTH

| INPUT PORTS | OUTPUT PORTS | | | | | | | | |
|---|---|---|---|---|---|---|---|---|---|
| | | 1 | 2 | 3 | 4 | 5 | 6 | 7 | 8 | 9 |
| 1 | | λ1 | λ2 | λ3 | λ4 | λ5 | λ6 | λ7 | λ8 | λ9 |
| 2 | | λ15 | λ1 | λ2 | λ3 | λ4 | λ5 | λ6 | λ7 | λ8 |
| 3 | | λ14 | λ15 | λ1 | λ2 | λ3 | λ4 | λ5 | λ6 | λ7 |
| 4 | | λ13 | λ14 | λ15 | λ1 | λ2 | λ3 | λ4 | λ5 | λ6 |
| 5 | | λ12 | λ13 | λ14 | λ15 | λ1 | λ2 | λ3 | λ4 | λ5 |
| 6 | | λ11 | λ12 | λ13 | λ14 | λ15 | λ1 | λ2 | λ3 | λ4 |
| 7 | | λ10 | λ11 | λ12 | λ13 | λ14 | λ15 | λ1 | λ2 | λ3 |
| 8 | | λ9 | λ10 | λ11 | λ12 | λ13 | λ14 | λ15 | λ1 | λ2 |
| 9 | | λ8 | λ9 | λ10 | λ11 | λ12 | λ13 | λ14 | λ15 | λ1 |

NODE APPARATUS, OPTICAL WAVELENGTH DIVISION MULTIPLEXING NETWORK, AND SYSTEM SWITCHING METHOD

STATEMENT OF RELATED APPLICATION

The present application is a divisional application of U.S. patent application Ser. No. 09/785,402, filed Feb. 20, 2001 now U.S. Pat No. 7,164,861, issued Jan. 16, 2007, in the name of the same inventors, which in turn claims the benefit of priority based on Japanese Patent Application Nos. 2000-043293, filed Feb. 21, 2000, and 2000-240232, filed Aug. 8, 2000, all commonly owned herewith.

BACKGROUND OF THE INVENTION

1. Field of the Invention

The present invention relates to an optical wavelength division multiplexing network which multiplexes and transmits optical signals having a plurality of different wavelengths.

2. Description of the Related Art

FIG. 25 shows an example of the constitution of a conventional optical wavelength division multiplexing network. The network shown in FIG. 25 has a ring structure comprising two or three layers. The network of FIG. 25 will be explained in separate sections comprising a network (1) 11, a network (2) 12, a network (3) 13, a network (4) 14, and a network (5) 15. The network (1) 11 has a ring structure, and is provided at the highest level. The network (1) 11 comprises at least one center node 21 and two or more (three in FIG. 1) remote nodes 22, 23, and 24. The network (2) 12 is a ring network comprising a node (#4) 24, which is one of the remote nodes of the network (1) 11, and is provided below the network (1) 11. The network (3) 13 comprises a tree-shaped structure centered on a node (#41) 25, which is one of the nodes of the network (2) 12, and is provided below the network (2) 12. The network (4) 14 comprises a ring-shaped structure centered on a node (#3) 23, which is one of the remote nodes of the network (1) 11, and is provided below the network (1) 11. The network (5) 15 comprises a tree-shaped structure centered on a node 27, which is one of a plurality of nodes 23, 26, 27, and 28 of the network (4) 14, and can conceivably be provided below the network (4) 14. Optical network units (ONU) (they are also called optical service units.) 51 to 56 comprise the subscribers of each home, business office, and the like, and are provided in the network (3) 13 or the network (5) 15.

In FIG. 25, the nodes of network (1) 11, the network (2) 12, and the network (4) 14, are connected by optical fiber transmission paths 60, 60, . . . which comprise a plurality of optical fibers. The ONUs are connected to the nodes of the networks (3) 13 and (5) 15 by optical fiber transmission paths 70, 70, . . . which comprise a single optical fiber. Equipment for signal termination electrically processes transmission signals, which have been converted from optical signals to electrical signals, and are provided at the nodes 21 to 28.

In this explanation, traffic from subscribers in the network (3) 13 or the network (5) 15 is assumed to be 1.5 Mb/s. The traffic from the subscribers is multiplexed at the subscriber office (node 25 or node 27), and transmitted to the node (#4) 24 in the network (2) 12 or the remote node (#3) 23 in the network (1) 11 at a higher transmission speed of, for example, 52 Mb/s. At the node (#41) 25 and the node 27, traffic sent from other nodes in the network (2) 12 or the network (4) 14 is combined with the multiplexed traffic from the subscribers, and transmitted to the next node in the network (2) 12 or the network (4) 14 at an even high transmission speed. Transmission speed conversion and the like is also carried out at the nodes in the network (1) 11. That is, electrical processing is carried out at each node.

In conventional optical networks such as that shown in FIG. 25, when starting a new high-speed access service for users at a speed of, for example, approximately 150 Mb/s or 1 Gb/s, transmission apparatuses which carry out electrical processing for multiplexing the traffic must be provided at each node, since there are several users belonging to the network (3) 13 or the network (5) 15. Consequently, the initial expenditure is considerable. Moreover, depending on the region, there may be fewer users per node, leading to a drawback of expenditure efficiency.

SUMMARY OF THE INVENTION

Accordingly, it is an object of this invention to provide an optical wavelength division multiplexing network which can carry out large-capacity optical access services with a simpler constitution. It is a more specific object of this invention to provide the optical wavelength division multiplexing network which enables initial expenditure to be reduced in large-capacity optical access services using ONU.

In order to solve the problems mentioned above, a first aspect of this invention provides an optical wavelength division multiplexing network having a structure comprising at least two layers, a highest level network being a ring network which comprises at least one center node and two or more remote nodes which are joined by at least two optical fibers; in the case where the layered structure comprises three or more layers, excepting the lowest level network the intermediate level network comprising a ring having the node belonging to the highest level network as its center node, nodes belonging to the ring network being joined by at least two optical fibers; the lowest level network comprising a star network centered around an access node which multiplexes traffic from one or a plurality of optical network units (ONU), the ONU and the access node being directly joined by at least one optical fiber; the remote nodes amplifying optical wavelength division multiplexing signals which are transmitted on an optical fiber comprising the higher level network which the remote nodes belong to, branching the signals to an optical fiber comprising the lower level network, and coupling optical wavelength division multiplexing signals, input from an optical fiber comprising the lower level network, to optical wavelength division multiplexing signals transmitted on an optical fiber comprising the higher level network, and amplifying the coupled signals; the access node amplifying the optical wavelength division multiplexing signals transmitted from the optical fibers which comprise the higher level network which the access node is connected to, selecting optical signals having wavelengths which correspond to the ONU, and outputting the selected signals to the ONU; multiplexing the optical signals transmitted from the ONU, dividing the multiplexed signals in a plurality of directions, amplifying the divided signals, and transmitting the amplified signals to an optical fiber comprising a higher level network which the access node is connected to; and the center node belonging to the highest level network and the ONU establishing a direct communication path by using lights of different wavelengths, the optical signals being amplified, branched, and routed at the remote nodes and the access node provided therebetween.

Furthermore, a first aspect of the center node comprising the optical wavelength division multiplexing network according to the first aspect described above comprising: a plurality of optical de-multiplexers which de-multiplex optical wavelength division multiplexing signals, input from optical fibers comprising the highest level network, to optical signals at each wavelength; a plurality of optical receivers which convert the optical signals which have been de-multiplexed by the optical de-multiplexers to electrical signals; a plurality of selectors which selectively output either of the outputs from the plurality of optical receivers; a signal termination section which performs predetermined electrical processing to the electrical signals which have been selected by the selectors, and outputs a plurality of groups of electrical signals; a plurality of optical senders which convert the electrical signals output from the signal termination section to a plurality of optical signals having different wavelengths; and a plurality of optical multiplexers which multiplex the optical signals output from the optical senders, and output the multiplexed signals to optical fibers comprising the highest level network.

A second aspect of the center node comprising the optical wavelength division multiplexing network according to the first aspect described above comprising: a plurality of optical de-multiplexers which de-multiplex optical wavelength division multiplexing signals, input from optical fibers comprising the highest level network, to optical signals at each wavelength; a plurality of optical switches which select one of the optical signal which have been de-multiplexed by the optical de-multiplexers; a plurality of optical receivers which convert the optical signals which have been selected by the optical switches to electrical signals; a signal termination section which performs predetermined electrical processing to the electrical signals which have been output from the optical receivers, and outputs a plurality of groups of electrical signals; a plurality of optical senders which convert the electrical signals output from the signal termination section to a plurality of optical signals having different wavelengths; and a plurality of optical multiplexers which multiplex the optical signals output from the optical senders, and output the multiplexed signals to optical fibers comprising the highest level network.

A third aspect of the center node comprising the optical wavelength division multiplexing network according to the first aspect described above comprising: a plurality of optical de-multiplexers which de-multiplex optical wavelength division multiplexing signals, input from optical fibers comprising the highest level network, to a plurality of optical signals at each wavelength; a plurality of optical switches which select one of the plurality of optical signals which have been de-multiplexed by the optical de-multiplexers; a plurality of optical receivers which convert the optical signals which have been selected by the optical switches to electrical signals; a signal termination section which performs predetermined electrical processing to the electrical signals which have been output from the optical receivers, and outputs a plurality of groups of electrical signals; a plurality of optical senders which convert the plurality of electrical signals output from the signal termination section to a plurality of optical signals having different wavelengths; a plurality of optical dividers which divide the optical signals output from the optical senders in a plurality of directions; and a plurality of optical multiplexers which multiplex the plurality of optical signals output from the optical dividers, and output the multiplexed signals to optical fibers comprising the highest level network.

A remote node comprising the optical wavelength division multiplexing network according to the first aspect described above comprising: passive optical components which branch optical signals transmitted on an optical fiber comprising a higher level network to an optical fiber comprising a lower level network, and couple optical signals input from an optical fiber comprising the lower level network to optical signals transmitted on an optical fiber comprising the higher level network; and optical amplifiers which amplify the optical signals input to the passive optical components and the optical signals output from the passive optical components.

An access node comprising the optical wavelength division multiplexing network according to the first aspect described above comprising: an optical switch which selects one of the optical signals which are input from optical fibers comprising a higher level network; a first optical amplifier which amplifies, among the optical signals which are input from the optical fibers comprising the higher level network, at least the optical signal selected by the optical switch; an optical multiplexer/de-multiplexer which, based on the optical signal selected by the optical switch, selects an optical signal having a wavelength which corresponds to the ONU, outputs the selected signal to the ONU, and multiplexes the optical signals transmitted from the ONU; an optical divider which divides the optical signal, multiplexed by the optical multiplexer/de-multiplexer, into a plurality of directions, and transmits the divided signals to the optical fibers comprising the higher level network; and a second optical amplifier which amplifies the optical signals which are transmitted to the optical fibers comprising the higher level network.

A second aspect of this invention provides an optical wavelength division multiplexing network having a structure comprising at least two layers, a highest level network being a ring network which comprises at least one center node and two or more remote nodes which are joined by at least two optical fibers; a lowest level network comprising a star network centered around an access node which multiplexes traffic from one or a plurality of optical network units (ONU), the ONU and the access node being directly joined by at least one optical fiber; an immediately higher level network of the lowest level network being a ring network comprising at least one the access node connected by at least two fibers, traffic from the access nodes being multiplexed at a center node in the ring network which the access node belongs to, and connected by the center node to an even higher level network; the remote node amplifying and branching optical wavelength division multiplexing signals which are transmitted on an optical fiber comprising the higher level network which the remote node belongs to, de-multiplexing and receiving only optical signals at wavelengths corresponding to the ONU, electrically processing the optical signals, and transmitting the processed signals at a predetermined wavelength to optical fibers comprising a lower level network; de-multiplexing and receiving only optical signals among the optical wavelength division multiplexing signals, input along the optical fibers comprising the lower level network, which are at wavelengths corresponding to the ONU, electrically processing the optical signals, converting the processed signals to optical signals at wavelengths which were allocated beforehand, and coupling the converted signals to optical wavelength division multiplexing signals transmitted on optical fibers comprising the higher level network; the access node provided between the remote node and the ONU amplifying the optical wavelength division multiplexing signals which are transmitted on the optical fibers comprising the higher level network which the access node is connected to, selecting optical signals which correspond to the ONU and outputting the selected signals thereto; and multiplexing the optical signals from the ONU, dividing the multiplexed signal in a plurality of directions, amplifying the divided signals, and transmitting the amplified signals on optical fibers comprising the higher level network which the access node is connected to; and optical signals having different wavelengths being transmitted between the ONU and the remote node in the higher level network, which is the center node in the ring network comprising the access node, the access node provided between the remote node and the ONU amplifying and routing the optical signals.

A first aspect of the center node comprising the optical wavelength division multiplexing network according to the second aspect described above comprising: a plurality of optical de-multiplexers which de-multiplex optical wavelength division multiplexing signals, input from optical fibers comprising the highest level network, to optical signals at each wavelength; a plurality of optical receivers which convert the optical signals which have been de-multiplexed by the optical de-multiplexers to electrical signals; a plurality of selectors which selectively output either of the outputs from the plurality of optical receivers; a signal termination section which performs predetermined electrical processing to the electrical signals which have been selected by the selectors, and outputs a plurality of groups of electrical signals; a plurality of optical senders which convert the electrical signals output from the signal termination section to a plurality of optical signals having different wavelengths; and a plurality of optical multiplexers which multiplex the optical signals output from the optical senders, and output the multiplexed signals to optical fibers comprising the highest level network.

A second aspect of the center node comprising the optical wavelength division multiplexing network according to the second aspect described above comprising: a plurality of optical de-multiplexers which de-multiplex optical wavelength division multiplexing signals, input from optical fibers comprising the highest level network, to optical signals at each wavelength; a plurality of optical switches which select one of the optical signal which have been de-multiplexed by the optical de-multiplexers; a plurality of optical receivers which convert the optical signals which have been selected by the optical switches to electrical signals; a signal termination section which performs predetermined electrical processing to the electrical signals which have been output from the optical receivers, and outputs a plurality of groups of electrical signals; a plurality of optical senders which convert the electrical signals output from the signal termination section to a plurality of optical signals having different wavelengths; and a plurality of optical multiplexers which multiplex the optical signals output from the optical senders, and output the multiplexed signals to optical fibers comprising the highest level network.

A third aspect of the center node comprising the optical wavelength division multiplexing network according to the second aspect described above comprising: a plurality of optical de-multiplexers which de-multiplex optical wavelength division multiplexing signals, input from optical fibers comprising the highest level network, to a plurality of optical signals at each wavelength; a plurality of optical switches which select one of the plurality of optical signals which have been de-multiplexed by the optical de-multiplexers; a plurality of optical receivers which convert the optical signals which have been selected by the optical switches to electrical signals; a signal termination section which performs predetermined electrical processing to the electrical signals which have been output from the optical receivers, and outputs a plurality of groups of electrical signals; a plurality of optical senders which convert the plurality of electrical signals output from the signal termination section to a plurality of optical signals having different wavelengths; a plurality of optical dividers which divide the optical signals output from the optical senders in a plurality of directions; and a plurality of optical multiplexers which multiplex the plurality of optical signals output from the optical dividers, and output the multiplexed signals to optical fibers comprising the highest level network.

A remote node comprising the optical wavelength division multiplexing network according to the second aspect described above comprising: passive optical components which branch optical signals transmitted on optical fibers comprising the higher level network, and couple input optical signals to optical signals transmitted on optical fibers comprising the higher level network; optical amplifiers which amplify the optical signals input to the passive optical components and the optical signals output from the passive optical components; and an equipment for signal termination which de-multiplexes only the optical signals among those divided by the passive optical components at wavelengths corresponding to the ONU, receives and electrically processes the optical signals at each wavelength, and transmits the processed signals at a predetermined wavelength, and in addition, de-multiplexes only the optical signals among those input along the optical fibers comprising a lower level network which are at wavelengths corresponding to the ONU, receives and electrically processes the optical signals at each wavelength, converts the processed signals to optical signals at a wavelength allocated beforehand, and transmits the converted signals to the passive optical components.

An access node comprising the optical wavelength division multiplexing network according to the second aspect described above comprising: an optical switch which selects one of the optical signals which are input from optical fibers comprising a higher level network; a first optical amplifier which amplifies, among the optical signals which are input from the optical fibers comprising the higher level network, at least the optical signal selected by the optical switch; an optical multiplexer/de-multiplexer which, based on the optical signal selected by the optical switch, selects an optical signal having a wavelength which corresponds to the ONU, outputs the selected signal to the ONU, and multiplexes the optical signals transmitted from the ONU; an optical divider which divides the optical signal, multiplexed by the optical multiplexer/de-multiplexer, into a plurality of directions, and transmits the divided signals to the optical fibers comprising the higher level network; and a second optical amplifier which amplifies the optical signals which are transmitted to the optical fibers comprising the higher level network.

A third aspect of this invention provides an optical wavelength division multiplexing network having a structure comprising at least three layers, a highest level network being a ring network comprising at least one center node and two or more remote nodes which are joined by at least four optical fibers; an intermediate level network being a ring network having a node belonging to the higher level network as a center node thereof, access nodes belonging to the ring network being joined by at least four optical fibers; a lowest level network comprising a star network centered around an access node which multiplexes traffic from optical network units (ONU), the ONU and the access node being directly joined by at least one optical fiber; the remote node amplifying optical wavelength division multiplexing signals transmitted on the optical fibers comprising a higher level node which the remote node belongs to, branching the signals to optical fibers comprising a lower level network, and coupling optical wavelength division multiplexing signals which are input from optical fibers comprising the lower level network to optical wavelength division multiplexing signals transmitted on optical fibers comprising the higher level network, thereby amplifying the coupled signals; the access node amplifying optical wavelength division multiplexing signals transmitted on optical fibers comprising a higher level network, which the access node belongs to, branching the amplified signals to a lower level network for outputting the branched signals to the ONU; multiplexing optical signals transmitted from the ONU, dividing the multiplexed signals in a plurality of directions, coupling the divided signal to optical wavelength division multiplexing signals transmitted on optical fibers comprising a higher level network which the access node is connected to, and amplifying the coupled signals; and the center node belonging to the highest level network and the ONU establishing a direct communication path by using lights of different wavelengths, the optical signals being amplified, branched, or routed, at the remote nodes and the access nodes provided therebetween.

A fourth aspect of this invention provides an optical wavelength division multiplexing network having a structure comprising at least three layers, a highest level network being a ring network comprising at least one center node and two or more remote nodes which are joined by at least two optical fibers; an intermediate level network being a ring network having a node belonging to the higher level network as a center node thereof, access nodes belonging to the ring network being joined by at least four optical fibers; a lowest level network comprising a star network centered around an access node which multiplexes traffic from optical network units (ONU), the ONU and the access node being directly joined by at least one optical fiber; the remote nodes amplifying optical wavelength division multiplexing signals transmitted on the optical fibers comprising a higher level network which the remote nodes belong to, branching the signals to optical fibers comprising a lower level network, and coupling optical wavelength division multiplexing signals which are input from optical fibers comprising the lower level network to optical wavelength division multiplexing signals transmitted on optical fibers comprising the higher level network, and amplifying the coupled signals; the access node amplifying optical wavelength division multiplexing signals transmitted on optical fibers comprising a higher level network, which the access node belongs to, branching them to a lower level network for outputting the branched signals to the ONU; multiplexing optical signals transmitted from the ONU, dividing them in a plurality of directions, coupling the divided signals to optical wavelength division multiplexing signals transmitted on optical fibers comprising a higher level network which the access node is connected to, and amplifying the coupled signals; and the center node belonging to the highest level network and the ONU establishing a direct communication path by using lights of different wavelengths, the optical signals being only amplified, branched, or routed, at the remote nodes and the access node provided therebetween.

A center node comprising the optical wavelength division multiplexing network according to the third and fourth aspects described above comprising: a plurality of optical de-multiplexers which de-multiplex optical wavelength division multiplexing signals, input from optical fibers comprising the highest level network, to optical signals at each wavelength; a plurality of optical receivers which convert the optical signals which have been de-multiplexed by the optical de-multiplexers to electrical signals; a plurality of selectors which selectively output either of the outputs from the plurality of optical receivers; a signal termination section which performs predetermined electrical processing to the electrical signals which have been selected by the selectors, and outputs a plurality of groups of electrical signals; a plurality of optical senders which convert the electrical signals output from the signal termination section to a plurality of optical signals having different wavelengths; and a plurality of optical multiplexers which multiplex the optical signals output from the optical senders, and output the multiplexed signals to optical fibers comprising the highest level network.

A remote node comprising the optical wavelength division multiplexing network according to the third aspect described above comprising: passive optical components which branch optical signals transmitted on optical fibers comprising a higher level network to optical fibers comprising a lower level network, and in addition, couple optical signals input from optical fibers comprising the lower level network to optical signals transmitted on optical fibers comprising the higher level network; and optical amplifiers which amplify optical signals which are input to, and output from, the passive optical components; wherein both ends of the loop of optical fibers comprising the lower level network are opened by using optical terminators.

An access node comprising the optical wavelength division multiplexing network according to the third and fourth aspects described above comprising: first passive optical components which branch optical signals transmitted on optical fibers comprising a higher level network to a lower level network; an optical switch which selects one of the optical signals which have been branched by the first passive optical components; an optical multiplexer/de-multiplexer which transmits the optical signals selected by the optical switch toward the ONU, and multiplexes the optical signals transmitted from the ONU; an optical divider which divides the optical signals multiplexed by the optical multiplexer/de-multiplexer in a plurality of directions; second passive optical components which couple optical signals divided by the optical divider to optical signals transmitted on optical fibers comprising the higher level network; and optical amplifiers which amplify the optical signals which are input to and output from the first and second passive optical components.

A remote node comprising the optical wavelength division multiplexing network according to the fourth aspect described above comprising: passive optical components which branch optical signals transmitted on optical fibers comprising a higher level network to optical fibers comprising a lower level network, and in addition, couple optical signals input from optical fibers comprising the lower level network to optical signals transmitted on optical fibers comprising the higher level network; and optical amplifiers which amplify optical signals transmitted on the optical fibers comprising the higher level network; wherein one end of the loop of optical fibers comprising the lower level network is opened by using optical terminators.

A fifth aspect of this invention provides an optical wavelength division multiplexing network having a structure comprising at least two layers, a highest level network comprising a ring network having at least one center node and two or more remote nodes, which are joined by at least four optical fibers; intermediate level networks excepting the lowest level network comprising a ring network having a node belonging to the higher level network as a center node, and at least one node belonging to the intermediate level ring networks being joined by at least four optical fibers; the lowest level network comprising a star network centered around an access node belonging to the ring network which is provided immediately thereabove, the access node being joined to at least one optical network unit (ONU) by at least two optical fibers; the remote nodes amplifying optical wavelength division multiplexing signals transmitted on the optical fibers comprising a higher level node which the remote nodes belong to, branching the signals to optical fibers comprising a lower level network; and coupling optical wavelength division multiplexing signals which are input from optical fibers comprising the lower level network to optical wavelength division multiplexing signals transmitted on optical fibers comprising the higher level network; the access node amplifying optical wavelength division multiplexing signals transmitted on optical fibers comprising a higher level network which the access node is connected to, branching the amplified signals to a lower level network, amplifying the divided signals, and outputting the amplified signals to the ONU; multiplexing and amplifying optical signals transmitted from the ONU, dividing the amplified signals in a plurality of directions, coupling the divided signals to optical wavelength division multiplexing signals transmitted on optical fibers comprising a higher level network which the access node is connected to, and amplifying the coupled signals; and the center node belonging to the highest level network transmitting data by using different wavelengths allocated to the ONU, the ONU transmitting the data to the center node by using optical signals having the same wavelengths as the allocated wavelengths; and the access nodes and the remote nodes provided between the center node and the ONU only amplifying and dividing, or routing, the optical signals.

A center node comprising the optical wavelength division multiplexing network according to the fifth aspect described above comprising: a plurality of optical de-multiplexers which de-multiplex optical wavelength division multiplexing signals, input from optical fibers comprising the highest level network, to optical signals at each wavelength; a plurality of optical receivers which convert the optical signals which have been de-multiplexed by the optical de-multiplexers to electrical signals; a plurality of selectors which selectively output either of the outputs from the plurality of optical receivers; a signal termination section which performs predetermined electrical processing to the electrical signals which have been selected by the selectors, and outputs a plurality of groups of electrical signals; a plurality of optical senders which convert the electrical signals output from the signal termination section to a plurality of optical signals having different wavelengths; and a plurality of optical multiplexers which multiplex the optical signals output from the optical senders, and output the multiplexed signals to optical fibers comprising the highest level network.

A remote node comprising the optical wavelength division multiplexing network according to the fifth aspect described above comprising: first passive optical components which branch optical signals transmitted on optical fibers comprising a higher level network to optical fibers comprising a lower level network; second passive optical components which couple optical signals input from optical fibers comprising the lower level network to optical signals transmitted on optical fibers comprising the higher level network; and optical amplifiers which amplify optical signals which are input to, and output from, the first and second passive optical components; wherein both ends of the loop of optical fibers comprising the lower level network are opened by using optical terminators.

An access node comprising the optical wavelength division multiplexing network according to the fifth aspect described above comprising: first passive optical components which branch optical signals transmitted on optical fibers comprising a higher level network to a lower level network; an optical switch which selects one of the optical signals which have been branched by the first passive optical components; a first optical amplifier which amplifies, among the optical signals which have been branched by the first passive optical components, at least the optical signal selected by the optical switch; a second passive optical component which distributes the optical signals amplified by the first optical amplifier to the ONU, and multiplexes the optical signals transmitted from the ONU; a second optical amplifier which amplifies the optical signals multiplexed by the second passive optical component; an optical divider which divides the optical signal, amplified by the second optical amplifier, into a plurality of directions; a third passive optical component which couples the optical signals branched by the optical divider to an optical signal transmitted on optical fibers comprising the higher level network; and a third optical amplifier which amplifies the optical signals which are transmitted on the optical fibers comprising the higher level network.

In this invention, the center node belonging to the highest level network and the ONU establish a direct communication path by using lights of different wavelengths. At the nodes therebetween, the signals are amplified, branched, and routed in their optical format without being electrically processed. In other words, the center node of the network which is the final multiplexing destination of the traffic can be directly linked to the user by an optical signal at a certain wavelength. No electrical processing is performed at the nodes in between. The users and the center node are directly joined by optical signals at different wavelengths. In this case, only the center node multiplexes traffic from users, and carries out electrical processing such as communicating with other users in the regional network, distributing traffic to the core network, and the like. Therefore, according to this invention, it is possible to provide an optical wavelength division multiplexing network which can carry out large-capacity access services with a simpler constitution.

Furthermore, according to a system switching method in the optical wavelength division multiplexing network of this invention, when an optical fiber (working fiber), which is being used in transmitting a down signal from the center node to the ONU in the higher level network, becomes severed, an access node belonging to a remote node provided downstream than the severance point as seen from the center node, switches from the working fiber side to an optical fiber side (protection fiber) which is not presently in use, the down signal being received after transmission along the protection fiber; when a working fiber for transmitting an up signal from the ONU to the center node in the higher level network has become severed, for an access node belonging to remote node where the severance point on the working fiber to the center node is located, the center node switches from the working fiber to a protection fiber, and receives the up signal from the protection fiber; and when an optical cable in the intermediate level network has become severed, an access node, among the access nodes connected to the intermediate level network, which is provided downstream than the severance point for the optical signal transmitted on the severed fiber switches from the working fiber to the protection fiber and thereby receives the down signal; and at the access node provided downstream, the center node switches from the working fiber to the protection fiber and thereby receives the up signal from the protection fiber.

BRIEF DESCRIPTION OF THE DRAWINGS

FIG. 14 is a diagram showing one example of the relationship between the wavelength of the AWG 115 of FIG. 13 and the input/output ports;

DETAILED DESCRIPTION OF THE PREFERRED EMBODIMENTS

Preferred embodiments of the optical wavelength division multiplexing network according to this invention will be explained with reference to the drawings.

Embodiment 1

Figure 1:
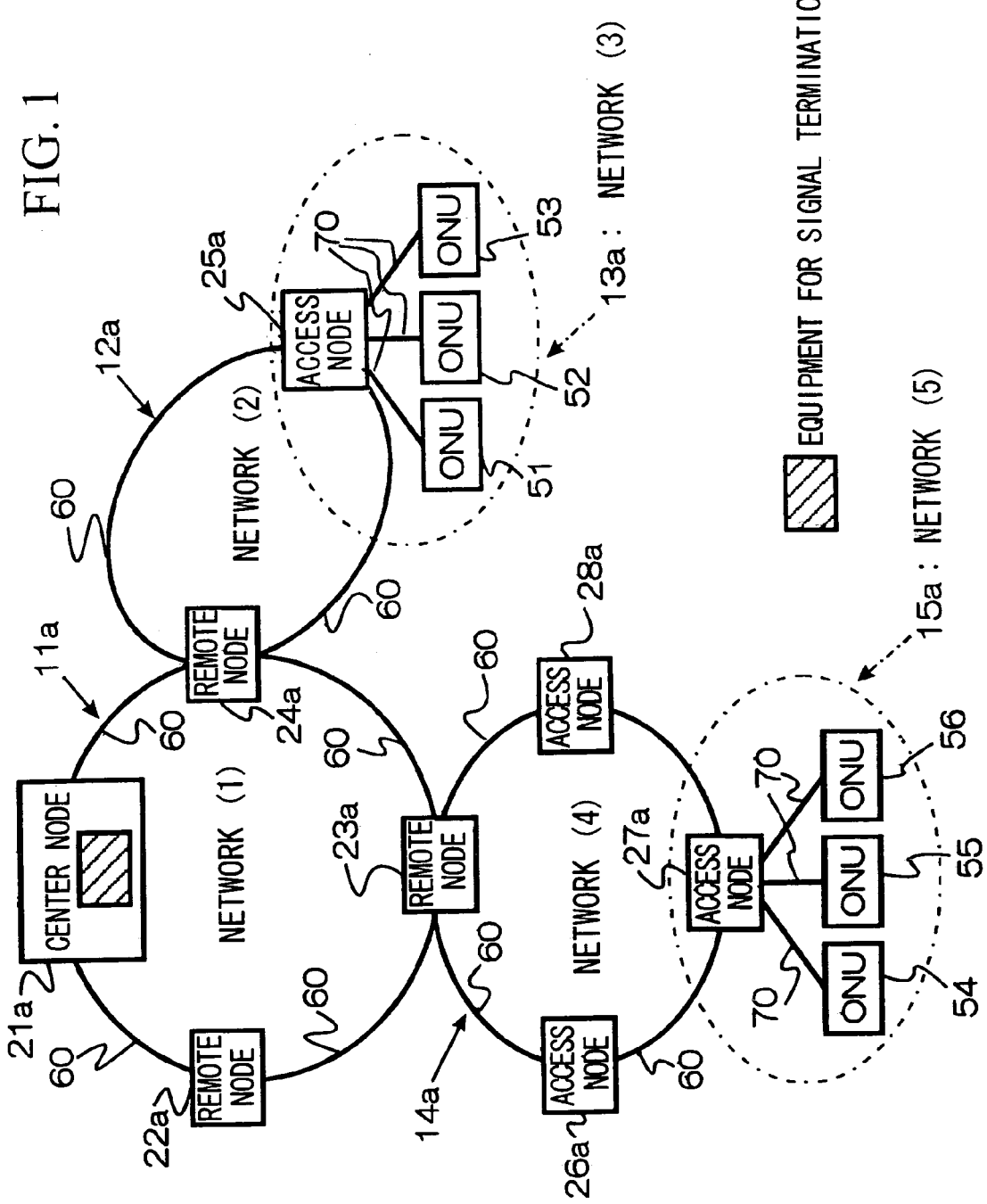
FIG. 1 is a block diagram showing the entire constitution of the optical wavelength division multiplexing network in the embodiments of this invention.
Figure 25:
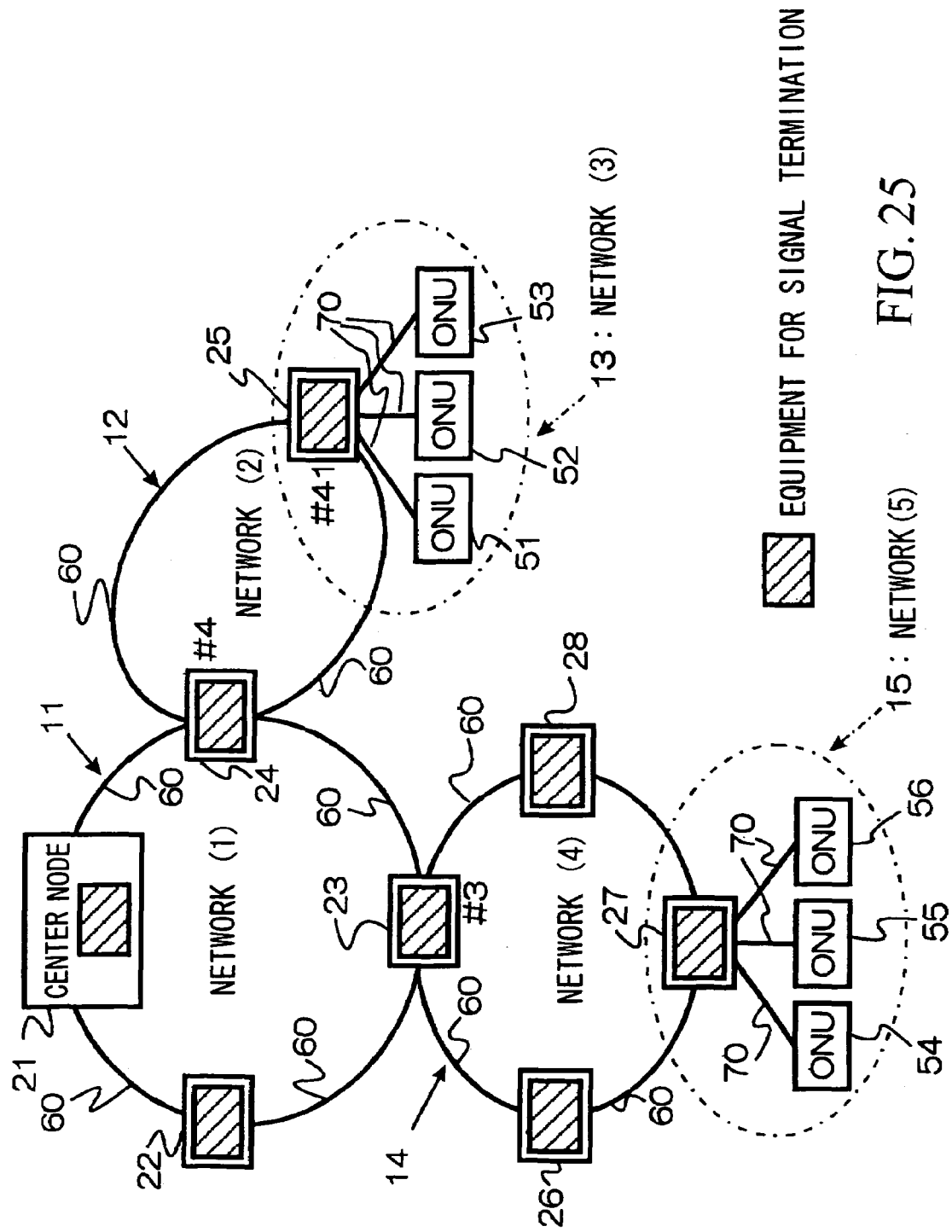
FIG. 25 is a block diagram showing one example of the constitution of a conventional optical wavelength division multiplexing network.

FIG. 1 is a block diagram showing the entire constitution of the optical wavelength division multiplexing network in this embodiment and in embodiments subsequently explained. As shown in FIG. 1, parts of the constitution which are identical to those in FIG. 25 are represented by the same reference numerals. Parts of the constitution which correspond to those in FIG. 25 are specified by adding the letter "a" to the end of the reference numerals shown in FIG. 25.

Figure 2:
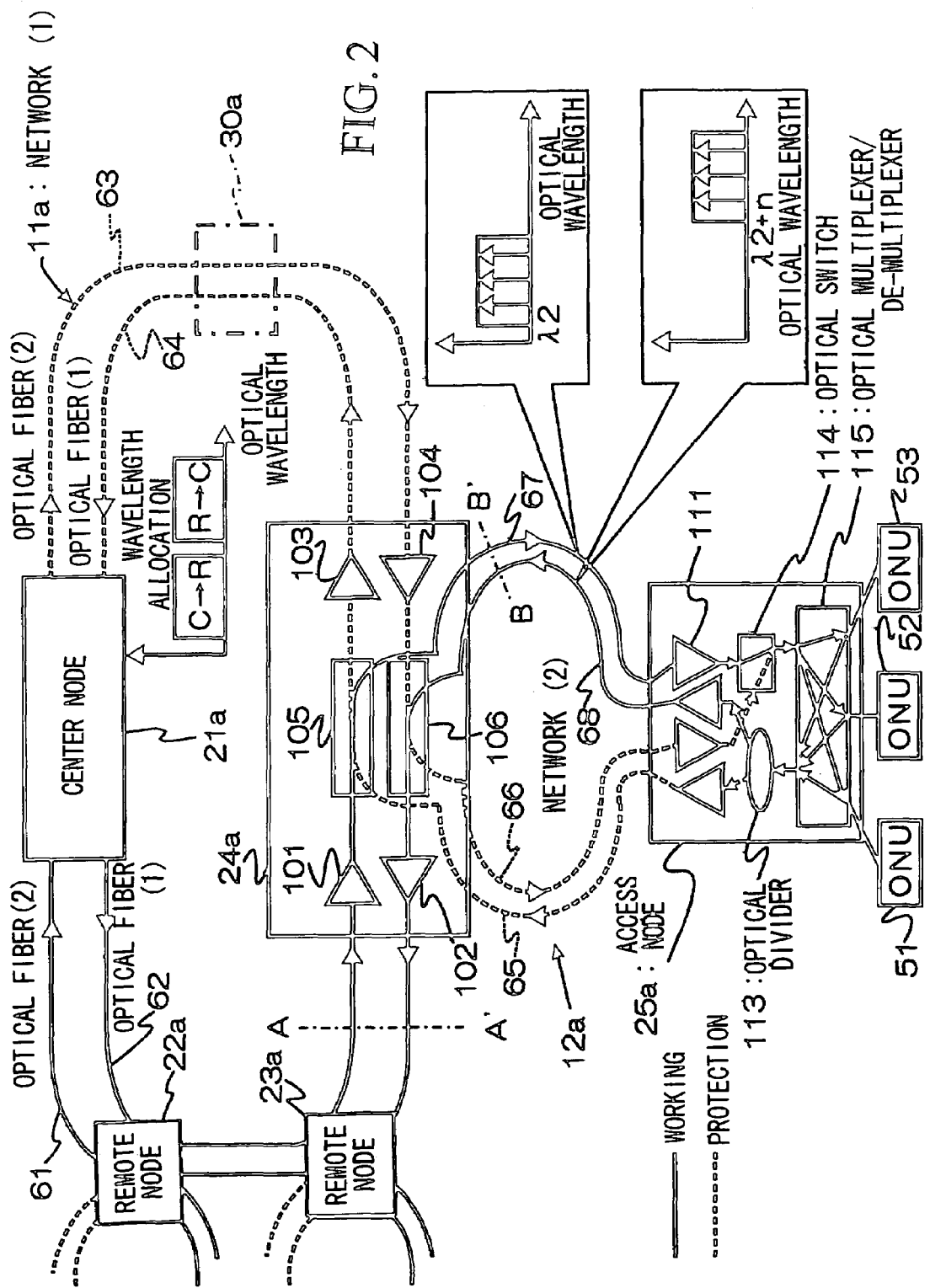
FIG. 2 is a block diagram showing the constitution of a first embodiment of this invention.

The first embodiment will be explained with reference to FIGS. 1 and 2. FIG. 2 is a block diagram showing the constitutions of the network (1) 11a, the network (2) 12a, and the network (3) 13a, shown in FIG. 1. This embodiment uses a two-fiber bi-directional ring constitution, in which the nodes of the networks (1) 11a, (2) 12a, etc., are connected by pairs of optical fibers which transmit optical signals in differing directions. For example, in the network (1) 11a, the nodes are connected by optical fibers (1) 62 and (2) 61, and optical fibers (1) 64 and (2) 63, which transmit optical signals in differing directions. In the network (2) 12a, the nodes are connected by optical fibers 65 and 66, and optical fibers 67 and 68, which transmit optical signals in differing directions.

In the example shown in FIG. 2, ONU 51, 52, and 53 are joined by optical signal transmitters comprising the linear optical fibers 65, 66, 67, 68, and the like, which extend from the node 24a belonging to the network (1) 11a having the center node 21a. In FIG. 2, the curved solid lines represent the fibers which are being used as working fibers (optical fibers 61, 62, 67, 68, etc.), and the dotted lines represent the fibers which are being used as protection fibers (optical fibers 63, 64, 65, 66, etc.). The optical networks in this embodiment, and in the embodiments described subsequently, are characterized in that, as shown in FIG. 1, the optical signals are not electrically processed (i.e. processing performed when multiplexing traffic, such as converting the transmission speed) at the remote nodes and access nodes (offices, telephone stations) other than the center node (21a) belonging to the ring network (network (1) 11a) at the highest level.

Figure 4:
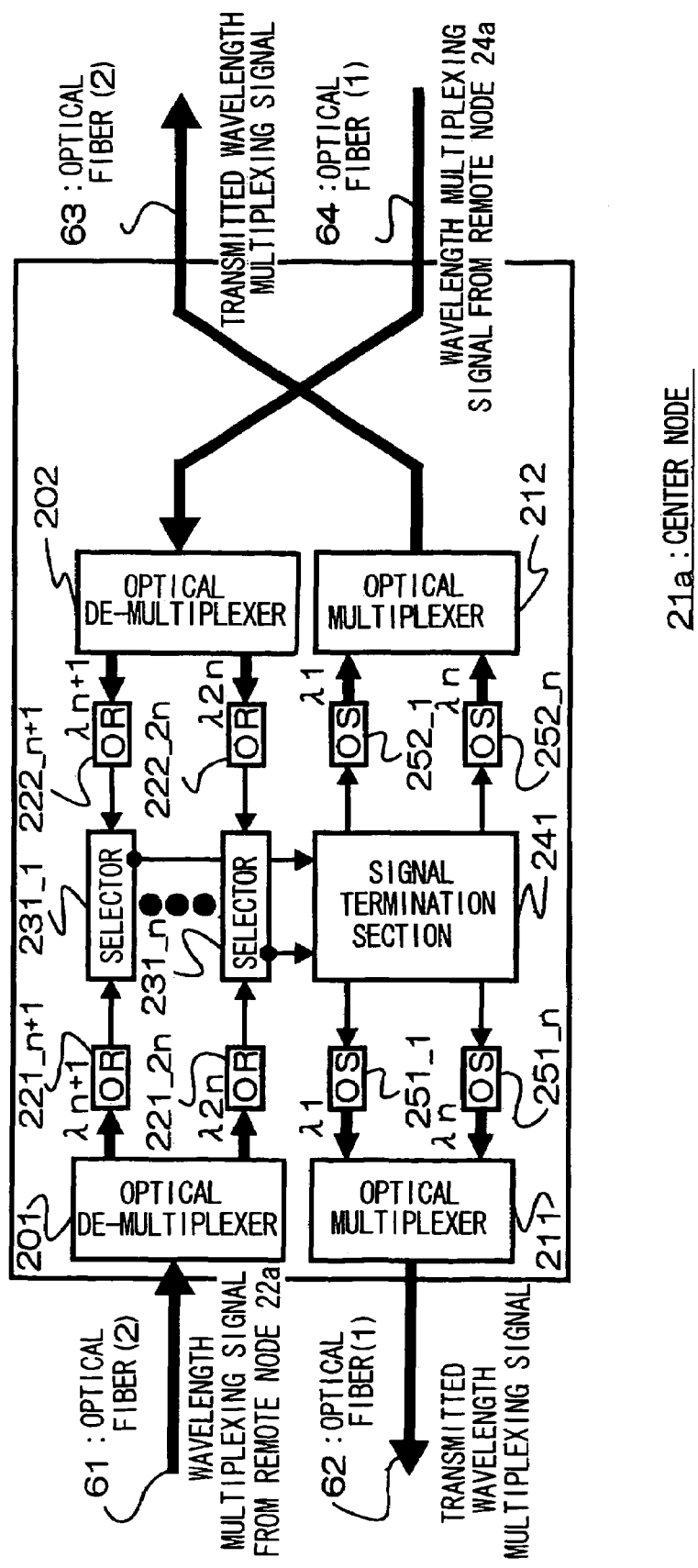
FIG. 4 is a block diagram showing one example of the constitution of a center node 21a shown in FIGS. 1 to 3 and FIGS. 7 to 11.
Figure 5:
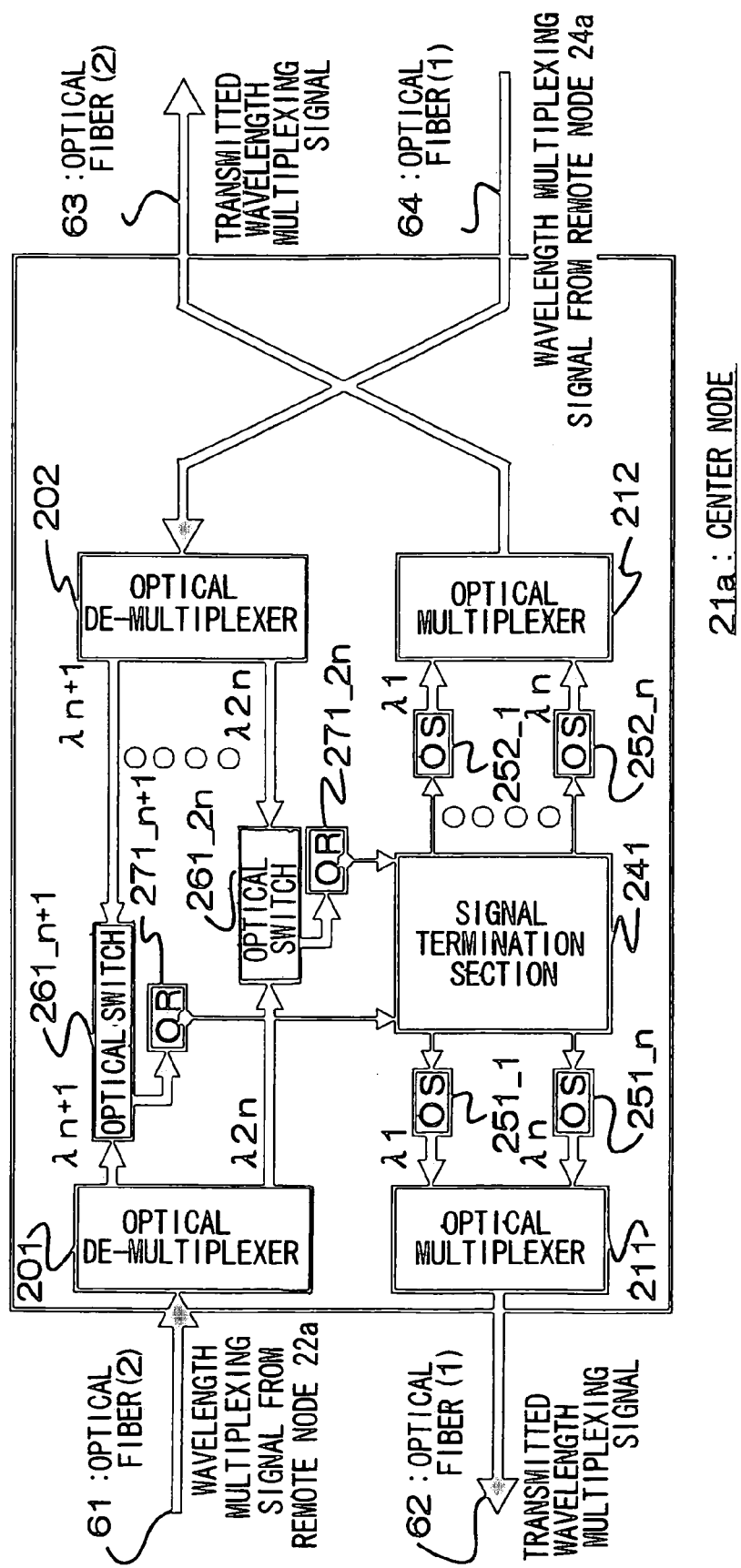
FIG. 5 is a block diagram showing another example of the constitution of the center node 21a shown in FIGS. 1 to 3 and FIGS. 7 to 11.
Figure 6:
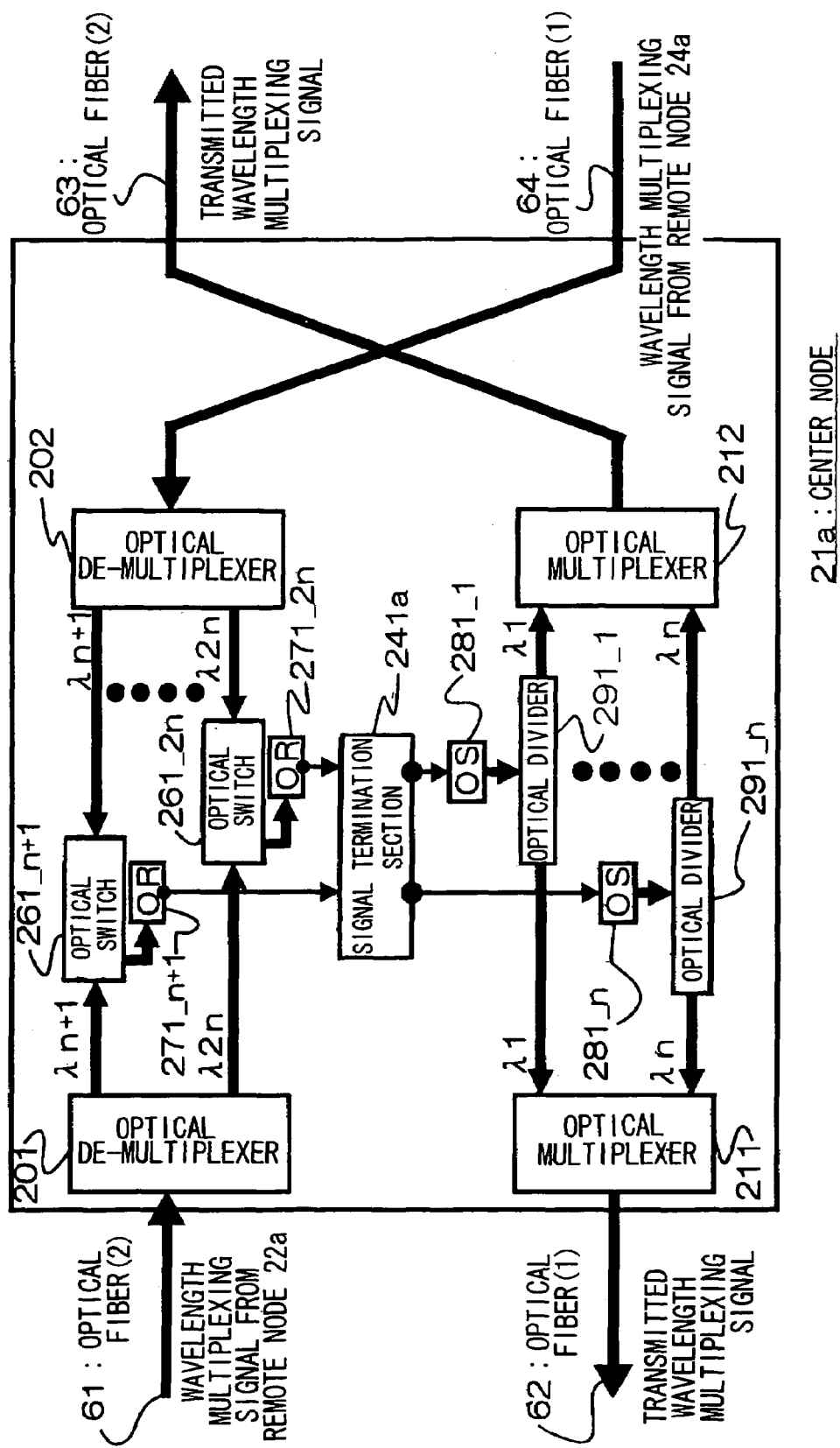
FIG. 6 is a block diagram showing yet another example of the constitution of the center node 21a shown in FIGS. 1 to 3 and FIGS. 7 to 11.

This feature will be explained in detail. The constitution of the center node 21a shown in FIGS. 1 and 2 will be explained with reference to FIGS. 4 to 6. In FIGS. 4 to 6, signal lines for transmitting optical signal are represented by thick lines, and signal lines for transmitting electrical signals are represented by fine lines.

In the constitution shown by way of example in FIG. 4, the center node 21a of FIG. 2 comprises an optical de-multiplexer 201 which de-multiplexes a wavelength division multiplexing signal, which is input from the remote node 22a via the optical fiber (2) 61 and has n different wavelengths from $\lambda n+1$ to $\lambda 2n$, to n optical signals at each wavelength, an optical de-multiplexer 202 which de-multiplexes a wavelength division multiplexing signal, which is input from the remote node 24a via the optical fiber (1) 64 and has n different wavelengths from $\lambda n+1$ to $\lambda 2n$, to n optical signals at each wavelength, n optical receivers 221_$n+1$ to 221_$2n$ and optical receivers 222_$n+1$ to 222_$2n$ which convert the n optical signals de-multiplexed by the optical de-multiplexers 201 and 202 to electrical signals, n selectors 231_1 to 231_$n$ which selectively output either one of the outputs from the optical receivers 221_$n+1$ to 221_$2n$ and the optical receivers 222_$n+1$ to 222_$2n$, an equipment for signal termination 241 which performs predetermined electrical processing to the electrical signals output from the selectors 231_1 to 231_$n$ and outputs two groups of n electrical signals, n optical senders 251_1 to 251_$n$ and optical senders 252_1 to 252_$n$ which convert the electrical signals output from the equipment for signal termination 241 to optical signals having n different wavelengths from λ1 to λn, an optical multiplexer 211 which multiplexes the optical signals output from the optical senders 251_1 to 251_n and outputs them to the optical fiber (1) 62, and an optical multiplexer 212 which multiplexes the optical signals output from the optical senders 252_1 to 252_n and outputs them to the optical fiber (2) 63.

In the constitution shown by way of example in FIG. 5, the center node 21a of FIG. 2 comprises an optical de-multiplexer 201, identical to that in the constitution shown in FIG. 4, which de-multiplexes a wavelength division multiplexing signal, which is input from the remote node 22a via the optical fiber (2) 61 and has n different wavelengths from λn+1 to λ2n, to n optical signals at each wavelength, an optical de-multiplexer 202 which de-multiplexes a wavelength division multiplexing signal, which is input from the remote node 24a via the optical fiber (1) 64 and has n different wavelengths from λn+1 to λ2n, to n optical signals at each wavelength, n optical switches 261_n+1 to 261_2n which selectively output either of the n optical signals output from the optical de-multiplexers 201 and 202, n optical receivers 271_1n+1 to 271_2n which convert the n optical signals output from the optical switches 261_n+1 to 261_2n to electrical signals, an equipment for signal termination 241 which performs predetermined electrical processing to the electrical signals output from the optical receivers 271_n+1 to 271_2n and outputs two groups of n electrical signals, n optical senders 251_1 to 251_n and optical senders 252_1 to 252_n which convert the electrical signals output from the equipment for signal termination 241 to optical signals having n different wavelengths from λ1 to λn, an optical multiplexer 211 which multiplexes the optical signals output from the optical senders 251_1 to 251_n and outputs them to the optical fiber (1) 62, and an optical multiplexer 212 which multiplexes the optical signals output from the optical senders 252_1 to 252_n and outputs them to the optical fiber (2) 63.

In the constitution shown by way of example in FIG. 6, the center node 21a of FIG. 2 comprises an optical de-multiplexer 201, identical to that in the constitution shown in FIG. 5, which de-multiplexes a wavelength division multiplexing signal, which is input from the remote node 22a via the optical fiber (2) 61 and has n different wavelengths from λn+1 to λ2n, to n optical signals at each wavelength, an optical de-multiplexer 202 which de-multiplexes a wavelength division multiplexing signal, which is input from the remote node 24a via the optical fiber (1) 64 and has n different wavelengths from λn+1 to λ2n, to n optical signals at each wavelength, n optical switches 261_n+1 to 261_2n which selectively output either of the n optical signals output from the optical de-multiplexers 201 and 202, n optical receivers 271_n+1 to 271_2n which convert the n optical signals output from the optical switches 261_n+1 to 261_2n to electrical signals, an equipment for signal termination 241a which performs predetermined electrical processing to the electrical signals output from the optical receivers 271_n+1 to 271_2n and outputs one group of n electrical signals, n optical senders 281_1 to 281_n which convert the electrical signals output from the equipment for signal termination 241a to optical signals having n different wavelengths from λ1 to λn, n optical dividers 291_1 to 291_n which divide into two the optical signals output from the n optical senders 281_1 to 281_n, an optical multiplexer 211 which multiplexes the n optical signals output from the optical dividers 291_1 to 291_n and outputs them to the optical fiber (1) 62, and an optical multiplexer 212 which multiplexes the n optical signals output from the optical dividers 291_1 to 291_n and outputs them to the optical fiber (2) 63.

The center node 21a having one of the constitutions shown in FIGS. 4 to 6 for example divides an electrical signal, which is to be transmitted to the remote node 22a, into two, and modulates two light sources (the optical senders 251_1 and 252_1) which have an oscillating frequency of wavelength λ1 by using the two optical signals. The center node 21a also modulates one light source (the optical sender 281_1), and the optical dividers 291_1 divides the signal therefrom. One of the divided signals is input to the optical fiber (1) 62, and the other is input to the optical fiber (2) 63. Similarly, the center node 21a modulates a light source having an oscillating frequency of wavelength λ2 and generates one group of optical signals by using an electrical signal which is to be transmitted to the remote node 23a. One of the divided signals is multiplexed with the optical signal having a wavelength λ1 and is input to the optical fiber (1) 62, and the other is multiplexed with the optical signal having a wavelength λ1 and is input to the optical fiber (2) 63. The n optical wavelength division multiplexing signals are input to the two optical fibers in the same manner. In this network, two wavelengths are allocated to the optical path which joins the center node 21a and the ONU 51 to 53. One wavelength is allocated when transmitting from the center node 21a to an ONU, and one wavelength is allocated when transmitting from the ONU to the center node 21a. Therefore, when the total number of ONU in the regional network of this example is one hundred, two hundred wavelengths are used.

One of the optical wavelength division multiplex signals which are output from the center node 21a is transmitted, for example, counterclockwise, and the other signal is transmitted clockwise. That is, the optical wavelength division multiplex signals are transmitted from the center node 21a to the remote nodes 22a, 23a and 24a counterclockwise at the optical fibers (1) 62 and 64, and clockwise at the optical fibers (2) 61 and 63. Consequently, as shown in FIG. 2, optical wavelength division multiplex signals from two optical fibers are input to the remote nodes.

Figure 13:
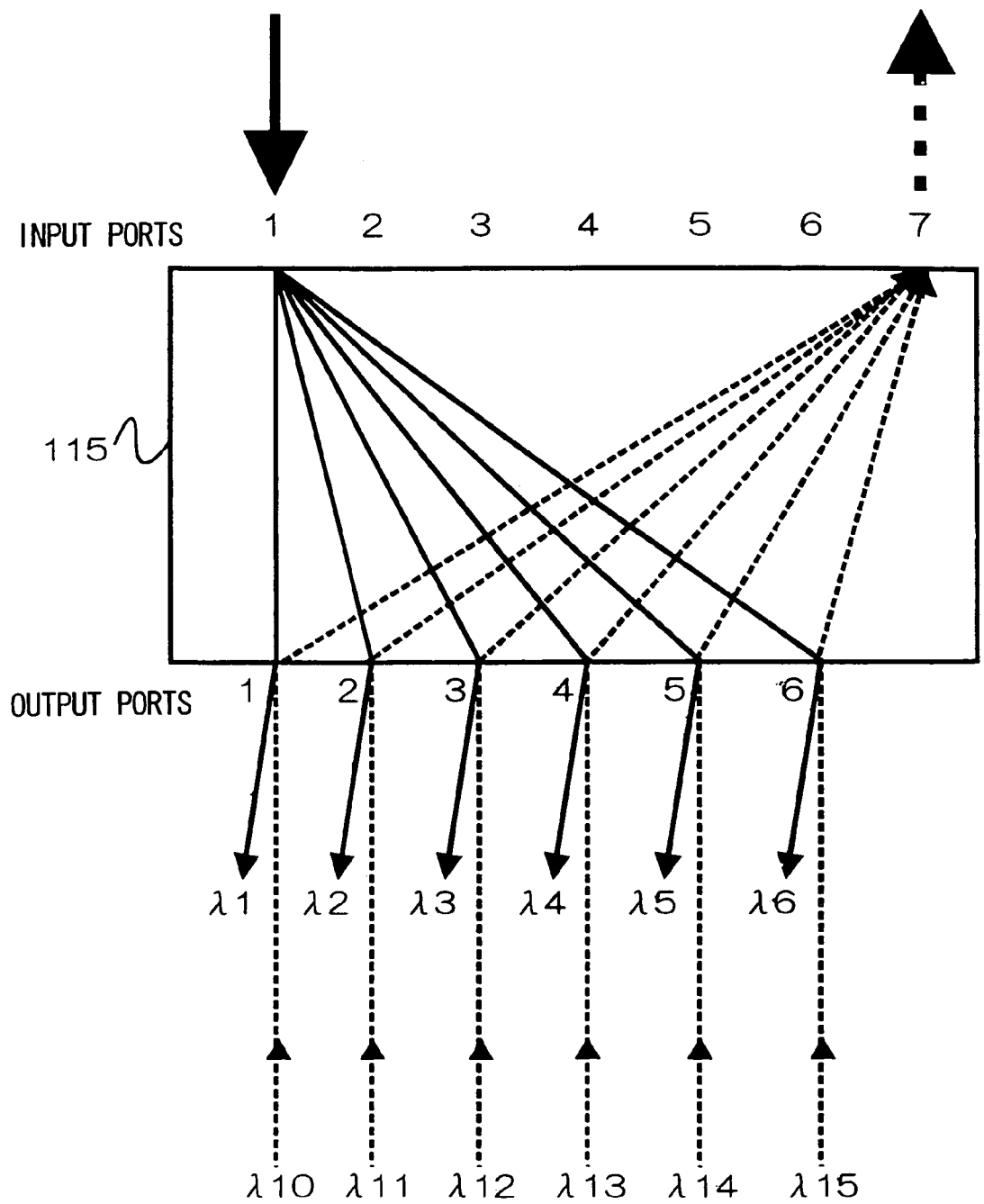
FIG. 13 is a block diagram showing an optical multiplexer/de-multiplexer 115 shown in these diagrams when it is arranged as an AWG.

Optical amplifiers 101, 103, 102, and 104 which amplify the optical signals which are input/output by using the optical fibers (1) and (2), and optical couplers (or optical circulators) 105 and 106 which couple light input from the optical fibers 65 or 68, comprising the network (2) 12a, to the optical signal which is transmitted along the optical fiber (1) or the optical fiber (2), and divides the light which is output to the optical fiber 66 or 67, are provided at the remote node 24a belonging to the network (1) 11a. An optical switch 114 for dealing with severed fibers, an AWG (arrayed waveguide grating) 115 comprising an optical multiplexer/de-multiplexer, optical amplifiers 111, 111, 111, and 111, and an optical divider 113 are provided at the remote node 25a which becomes the access node. FIG. 13 and FIG. 14 (Table 1) show one example of the relationship between the wavelength and input/output ports when using an AWG. For example, with regard to the WDM (wavelength division multiplex) signals which are input from the input port 1, a signal having a wavelength of λ1 is output from the output port 1. Conversely, when a signal having a wavelength of λ10 is input from the output port 1, the signal having a wavelength of λ1 is output from the input port 7. Therefore, the wavelength division multiplex signals can be de-multiplexed and multiplexed simultaneously by using the AWG. Here, λ1 to λ6, λ10 to λ15 represent different optical wavelengths arranged in sequence according to wavelength.

The center node 21a transmits signals constantly to the optical fiber (1) 62 and the optical fiber (2) 63 toward the ONU in the network. As a consequence, the same signal is transmitted along two paths and input to, for example, the optical switch 114 of the access node 25a. The optical switch 114 shown in FIG. 2 is set so as to select the optical signal which has been transmitted on the working fiber 67. The optical switch 114 selects only optical signals from the working fiber 67, and outputs them to the optical multiplexer/de-multiplexer 115. All of the for example one hundred optical signals which have been transmitted from the center node 21a toward all the ONU 51, 52, and 53, are input into the optical multiplexer/de-multiplexer 115. The optical multiplexer/de-multiplexer 115 selects only the corresponding wavelength and transmits this signal to the corresponding ONU 51, 52, and 53.

A wavelength which has not been used in transmission from the center node 21a is used for the optical signals to be transmitted from the ONU 51, 52, and 53 toward the center node 21a. The signals from the ONU 51, 52, and 53 are multiplexed by the optical multiplexer/de-multiplexer 115, and joined to the two optical transmission paths (represented by the solid and dotted lines) by using the optical divider 113 such as an optical coupler. After being amplified by the respective optical amplifiers 111, the signals are transmitted to the remote node 24a. Since the remote node 24a does not perform electrical processing, the signals from the ONU 51, 52, and 53 are received at the center node 21a from two paths comprising the optical fiber (1) 64 and the optical fiber (2) 61. The center node 21a receives the signals transmitted from the ONU 51, 52, and 53, and its own transmitted signal, and extracts only the signals from the ONU by using the optical de-multiplexers (201 and 202 in FIGS. 4 to 6). The signals from ONU which have been de-multiplexed by the optical de-multiplexers (201 and 202) are converted to electrical signals by the optical receivers (OR). From the converted electrical signals, a selector selects the electrical signals which corresponded to the working fiber. The selected signals are electrically processed, and distributed as signals to be transmitted within the network and signals to be transmitted to a network at a higher level. That is, no electrical processing is carried out at the access node and the remote nodes.

Subsequently, the operation when a fiber has become severed at position AA' in the network (1) 11a of FIG. 2 will be explained. The center node 21a is transmitting signals constantly toward the ONU in the network on both the optical fibers (1) 62 and (2) 63. Therefore, the same signal which has been transmitted along the two paths is input into the optical switch 114 of the access node 25a belonging to the network (2) 12a. The optical switch 114 shown in FIG. 2 is set so as to select the optical signal transmitted on the working fiber 67. However, when the fiber has been severed at AA', the optical switch 114 detects the severance of an input signal and automatically switches so as to select the signal which has been transmitted on the protection fiber 66, represented by the dotted line. On the other hand, the signals transmitted from the ONU 51, 52, and 53 to the center node 21a are divided by the optical divider 113 and always output to the working and protection paths comprising the fibers 68 and 65. Since the remote node 24a does not perform electrical processing, the signals from the ONU 51, 52, and 53 are normally received at the center node 21a from two paths comprising the optical fibers 61 and 64. When a fiber is severed, the selectors switch so that the signal which has been received from the working fiber will be received from the protection fiber 64.

Similarly, in the case where there is an access node belonging to the remote node (e.g. a remote node such as node 30a, represented by the chained line) provided downstream than to the signal being transmitted along the optical fiber (1), the optical switch switches from working to protection. The signal is then transmitted by using the protection path shown by the dotted line. In the case where there is an access node belonging to the remote node 22a, provided upstream with regard to the signal being transmitted along the optical fiber (1), the optical switch does not switch and the signal is transmitted along the working path. At the center node 21a, the selectors select each direction which a signal is input in at each wavelength, and the signals are transmitted.

Subsequently, an example will be explained in the case where the fiber has been severed at point BB' of the network (2) 12a shown in FIG. 2.

At the access node 25a which is connected to the remote node 24a, the optical switch 114 is switched to the direction shown by the dotted line. The switches at the other access nodes continue to input the signals in the working state, and consequently do not switch. At the center node 21a, the selectors select each direction which a signal is input in at each wavelength, and the signals are transmitted.

As described above, the optical signal is only electrically processed at the center node 21a and the ONU 51, 52, and 53, even when a fiber has been severed.

Embodiment 2

Figure 3:
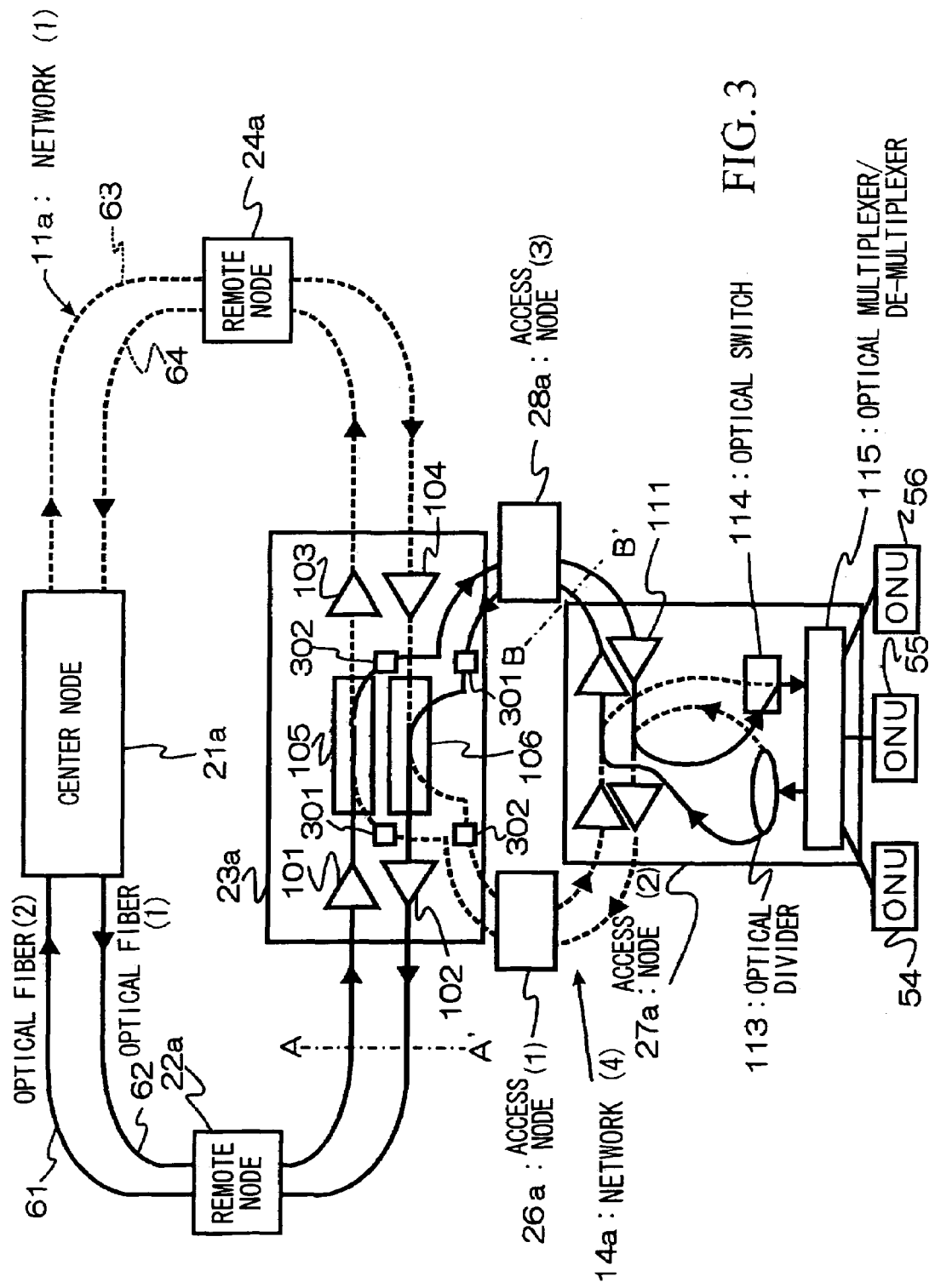
FIG. 3 is a block diagram showing the constitution of a second embodiment of this invention.

FIG. 3 shows an embodiment comprising a double ring. This embodiment differs from that shown in FIG. 2 in that (i) a plurality of access nodes are connected to the remote node, (ii) the access nodes are connected in a ring, and particularly (iii) this embodiment comprises an optical band pass filter which prevents optical signals at the wavelengths allocated to the ONU 54, 55, and 56, which belong to the ring network (4) 14a comprising the remote node 23a, from passing around the ring network. An optical band pass filter 301 which passes only wavelengths allocated for transmission from the remote node 23a to the center node 21a, and optical band pass filter 302 which passes only wavelengths allocated for transmission from the center node 21a to the remote node 23a, are connected to the input and output terminals of the optical coupler 105 in the remote node 23a. In addition, the optical band pass filters 301 and 302 are connected to the input and output terminals of an optical coupler 106. The constitution of these, and the operation of the optical switches at the access nodes in the case where the fiber becomes severed at the point AA', are the same as in the first embodiment. The constitution of the center node 21a is the same as that shown in FIGS. 4 to 6. Incidentally, the remote node 23a comprises the same elements as the internal constitution of the remote node 24a shown in FIG. 2. As shown by the access node (2) 27a, the optical amplifiers 111, 111, 111, and 111 in the access nodes (1) 26a to (3) 28a are arranged so that the optical fiber transmission paths form a ring, in the same manner as the remote node 23a.

Subsequently, the operation in the case where the fiber has become severed at point BB' will be explained. The optical switch at the access node (3) 28a does not switch, since communication is possible by using the working fiber shown by the solid line. Furthermore, the selector which corresponds to the wavelength allocated to the access node (3) 28a does not switch at the center node 21a. On the other hand, at the access nodes (2) 27a and (1) 26a which are provided downstream than the access node (3) 28a, the optical signal from the working fiber is severed. Consequently, the optical switch 114 switches to the protection fiber shown by the dotted line. The signals from the ONU 54, 55, and 56 are transmitted along the protection fiber to the center node 21a via the remote node 23a. At the center node 21a, the selector selects a signal which corresponds to the signal from the protection fiber. This has no effect on the access nodes corresponding to the remote node 22*a* and the remote node 24*a*.

In this network, the optical signal is electrically processed only at the center node and the ONU, even when a fiber has been severed.

Embodiment 3

Figure 7:
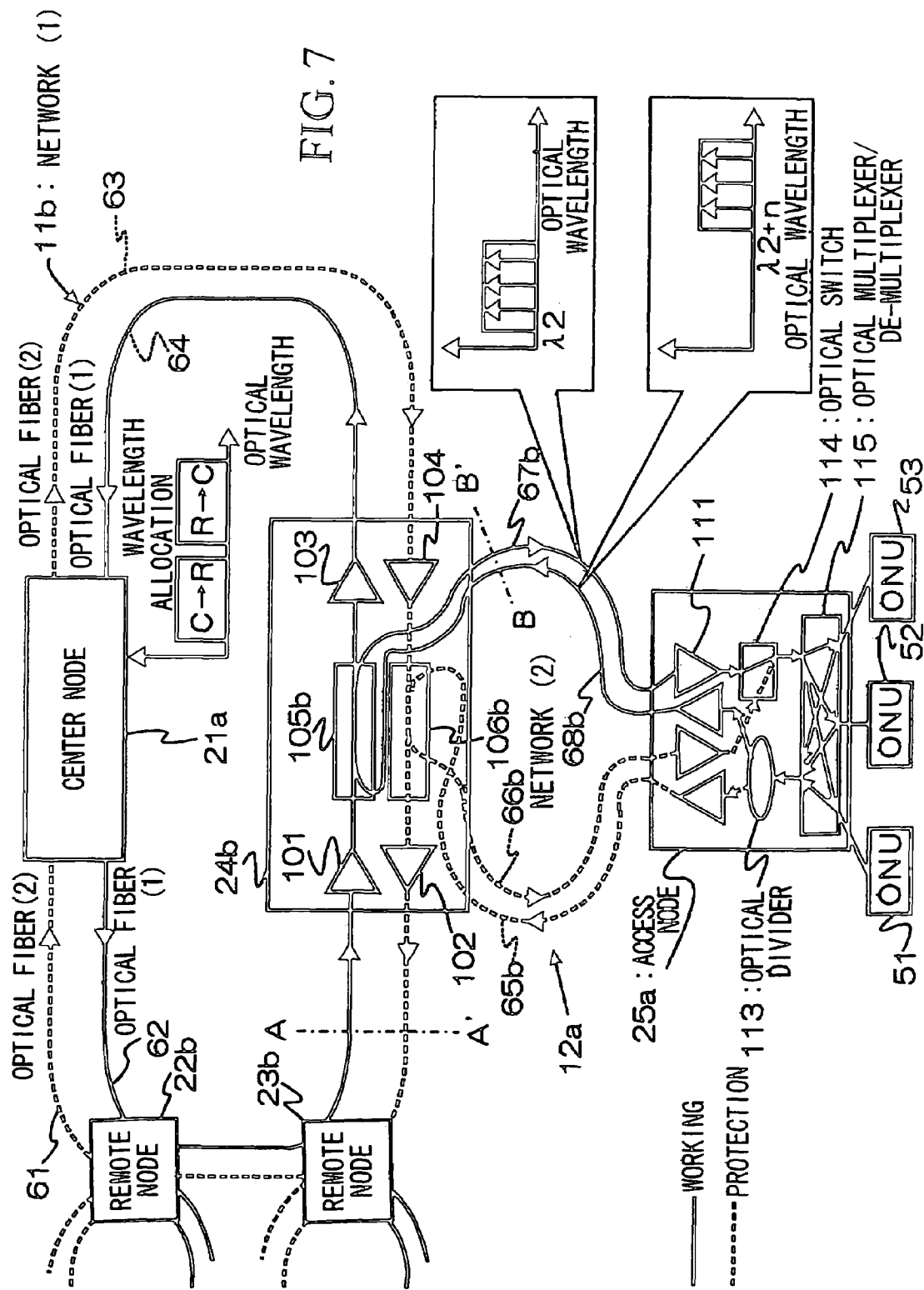
FIG. 7 is a block diagram showing the constitution of a third embodiment of this invention.

FIG. 7 shows an embodiment comprising a two-fiber unidirectional ring. This embodiment is characterized in that the transmission direction of the optical signal from the center node 21*a* to the remote node 24*b* (corresponding to the remote node 24*a* of FIG. 2) is the same as the transmission direction of the optical signal from the remote node 24*b* to the center node 21*a*. FIG. 7 shows the constitution of the remote node 24*b* and the access node 25*a* at this time. This constitution differs from that shown in FIG. 2 in that the up and down signals from the access node 25*a* are input to identical optical couplers 105*b* and 106*b*, provided at the remote node 24*b*. The optical fibers 67*b* and 68*b* (corresponding to the optical fibers 67 and 68 of FIG. 2) are connected to the optical coupler 105*b*, and the optical fibers 65*b* and 66*b* (corresponding to the optical fibers 65 and 66 of FIG. 2) are connected to the optical coupler 106*b*. Here, the network (1) 11*b* comprising the center node 21*a* is arranged as a two-fiber unidirectional ring which corresponds to the network (1) 11*a* of FIG. 2.

The operation when the optical fiber has been severed at point AA' will be explained. The optical signal from the optical fiber (1) 62 can be received at the access nodes which are connected at a lower level than the remote nodes 22*b* and 23*b* (corresponding to the remote nodes 22*a* and 23*a* of FIG. 2). Therefore, the optical switches which are provided at the access nodes do not switch to the protection fiber. In transmitting from the access node to the center node 21*a*, an optical divider, comprising an optical coupler or the like, divides the signal into two. The optical fiber (2) 61 is the protection fiber, and connects one of the divided signals to the center node 21*a*. The selector at the center node 21*a* selects the signal received from the optical fiber (2) 61. On the other hand, at the access node 25*a* which is connected at a lower level than the remote node 24*b*, the optical signal becomes severed. Consequently, the optical switch 114 switches to the protection system. In transmitting from the access node 25*a* to the center node 21*a*, only the signal in the divided output of the optical multiplexer/de-multiplexer 115 which is connected to the optical fiber (1) 64 is transmitted counterclockwise along the optical fiber (1) 64 to the center node 21*a*. Since the center node 21*a* has already selected the signal which was received from the optical fiber (1) 64, the selectors do not change its signal selection. Therefore, when the cable is severed at the point AA', the transmission path of the two-fiber unidirectional ring network becomes the same as that in the bi-directional ring.

Subsequently, the operation when the cable is severed at the point BB' will be explained. At the access node 25*a* connected to the remote node 24*b*, the optical switch 114 switches to the protection system when the cable is severed. The signal from the access node 25*a* to the remote node 24*b* is transmitted along the fibers 65*b* and 66*b*, represented by dotted lines, and connects to the protection optical fibers (2) 61 and 63 in the remote node 24*b*. The signal is transmitted clockwise along the optical fibers (2) 61 and 63. The selector at the center node 21*a* selects the signal which is received from the optical fiber (2) 61. The signals corresponding to the remote nodes 22*b* and 23*b* are not switched by the access nodes connected thereto, nor are they subject to the change in signal selection by the selectors at the center node 21*a*.

In the network described above, the optical signal is only electrically processed at the center node and the ONU even in the case where a fiber has been severed.

Embodiment 4

Figure 8:
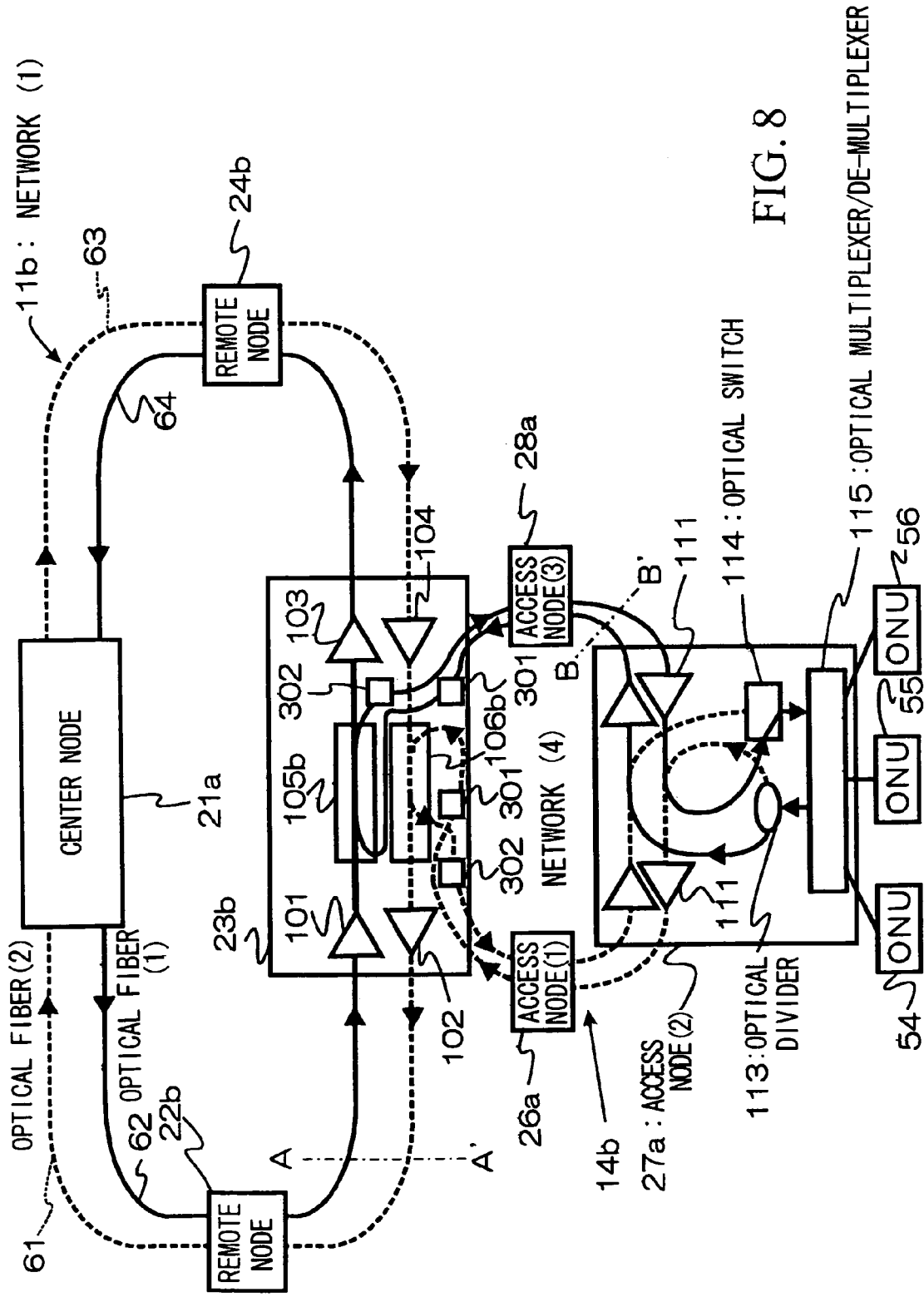
FIG. 8 is a block diagram showing the constitution of a fourth embodiment of this invention.

In the constitution shown in FIG. 8, the network (1) 11*b* (corresponding to the network (1) 11*a* of FIG. 3) comprising the center node 21*a* is a two-fiber unidirectional ring, and the lower level network (4) 14*b* (corresponding to the network (4) 14*a* of FIG. 3) also comprises a ring. This constitution differs from that shown in FIG. 3 in that the up and down signals from the access node are input to identical optical couplers 105*b* and 106*b*, provided at the remote node 23*b* (corresponding to the remote node 23*a* of FIG. 3), as in the remote node 24*b* of FIG. 7. Another important difference to FIG. 7 is that the provision of band-pass filters which prevent optical signals at the wavelengths allocated to the ONT 54, 55, and 56 in the ring network (4) 14*b* comprising the remote node 23*b*, from passing around the ring network. An optical band-pass filter 301 which passes only wavelengths allocated for transmission from the remote node 23*b* to the center node 21*a*, and optical band-pass filter 302 which passes only wavelengths allocated for transmission from the center node 21*a* to the remote node 23*b*, are connected to the input and output terminals of the optical coupler 105*b* and the optical coupler 106*b*. As in the previous embodiments, the optical switches of the access nodes and the selectors of the center nodes are normally set so as to select the signals from the working fiber, shown by the solid line.

The operation when the optical fiber has been severed at the point AA' will be explained. The optical signal from the optical fiber (1) 62 can be received at the access node which is connected at a lower level than the remote node 22*b*. Therefore, the optical switches which are provided at the access node lower level than the remote node 22*b* do not switch to the protection fiber. In transmitting from the access node to the center node 21*a*, an optical divider, comprising an optical coupler or the like, divides the signal into two. One of the divided signals is transmitted clockwise to the center node 21*a* along the optical fiber (2) 61, which comprises the protection fiber. The selector at the center node 21*a* selects the signal received from the optical fiber (2) 61. On the other hand, at the access node which is connected at a lower level than the remote nodes 23*b* and 24*b*, the optical signal becomes severed. Consequently, the optical switch switches to the protection system. In transmitting from the access node to the center node, only the signal in the divided output of the optical multiplexer/de-multiplexer which is connected to the optical fiber (1) 64 is transmitted counterclockwise along the optical fiber (1) 64 to the center node 21*a*. Since the center node 21*a* has already selected the signal which is received from the optical fiber (1) 64, the selectors do not change its signal selection. Therefore, when the cable is severed at the point AA', the transmission path of the two-fiber unidirectional ring network becomes the same as that in the bi-directional ring.

Subsequently, the operation when the cable is severed at the point BB' will be explained. Since the optical signal is not cut-off at the access node (3) 28*a* connected to the remote node 23*b*, the optical switch 114 does not switch. Since the signal is transmitted to the center node 21*a* along the working fiber, the selector in the receiving section of the center node 21*a* does not change its signal selection. On the other hand, the optical signal is cut-off at the access nodes (2) 27*a* and (1) 26*a*. Therefore, when the cable is severed, the optical switch 114 switches to the protection system, and the optical signal is received from the protection fiber. The signals from the access nodes 26a and 27a to the remote node 23b are transmitted along the fibers represented by dotted lines, and connect to the protection optical fibers (2) 61 and 63 through the optical coupler 106b in the remote node 23b. The signals are transmitted clockwise along the optical fibers (2) 61 and 63. The selector at the center node 21a selects the signal which was received from the optical fiber (2) 61. The signals corresponding to the remote nodes 22b and 24b are not switched at the access nodes connected thereto, nor are they subject to the change in signal selection by the selectors at the center node 21a.

In the network described above, the optical signal is only electrically processed at the center node and the ONU even in the case where a fiber has been severed.

Embodiment 5

Figure 9:
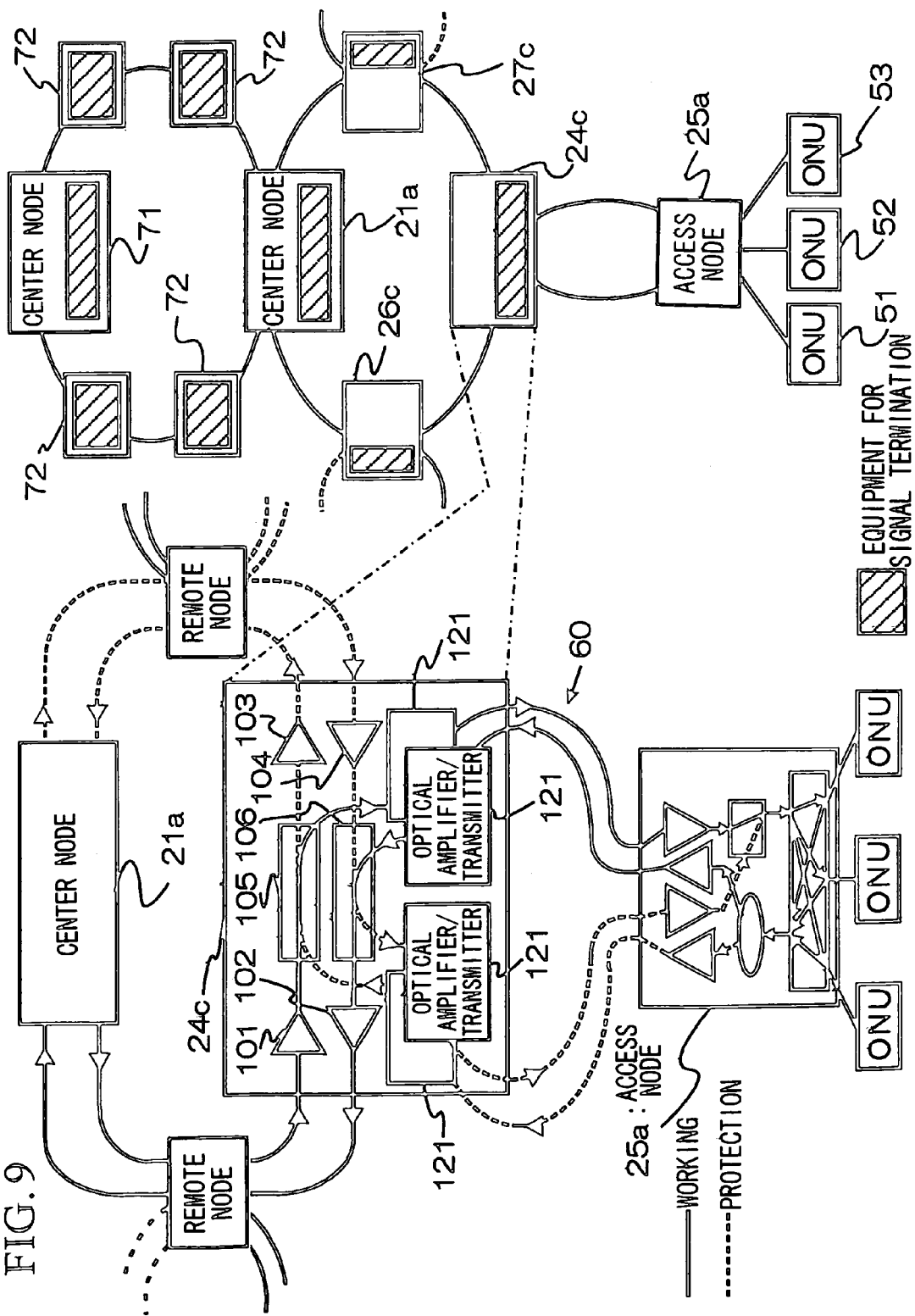
FIG. 9 is a block diagram showing the constitution of a fifth embodiment of this invention.

FIG. 9 shows an embodiment in which an optical signal is converted to an electrical signal by using transponders (in FIG. 9, optical amplifiers/senders) 121, 121, 121, and 121, in a remote node 24c corresponding to the remote node 24a of FIG. 2. At the remote node 24c, optical de-multiplexers in the transponders 121, 121, 121, and 121 de-multiplex only the wavelengths which correspond to the ONU 51, 52, and 53 belonging to lower levels. Signals at each wavelength are received, equalized, identified, reproduced, and retransmitted using appropriate wavelengths. Signals from the access node 25a are similarly processed, converted to predetermined wavelengths, and transmitted to the center node 21a. Signals can be multiplexed and de-multiplexed by using an optical multiplexer/de-multiplexer such as an AWG.

In the example shown in FIG. 9, remote nodes 26c and 27c have the same constitution as the remote node 24c, and are provided in the ring network comprising the center node 21a and the remote node 24c. A center node 71 and a plurality of remote nodes 72, 72, . . . are provided in the higher level ring network comprising the center node 21a.

Embodiment 6

Figure 10:
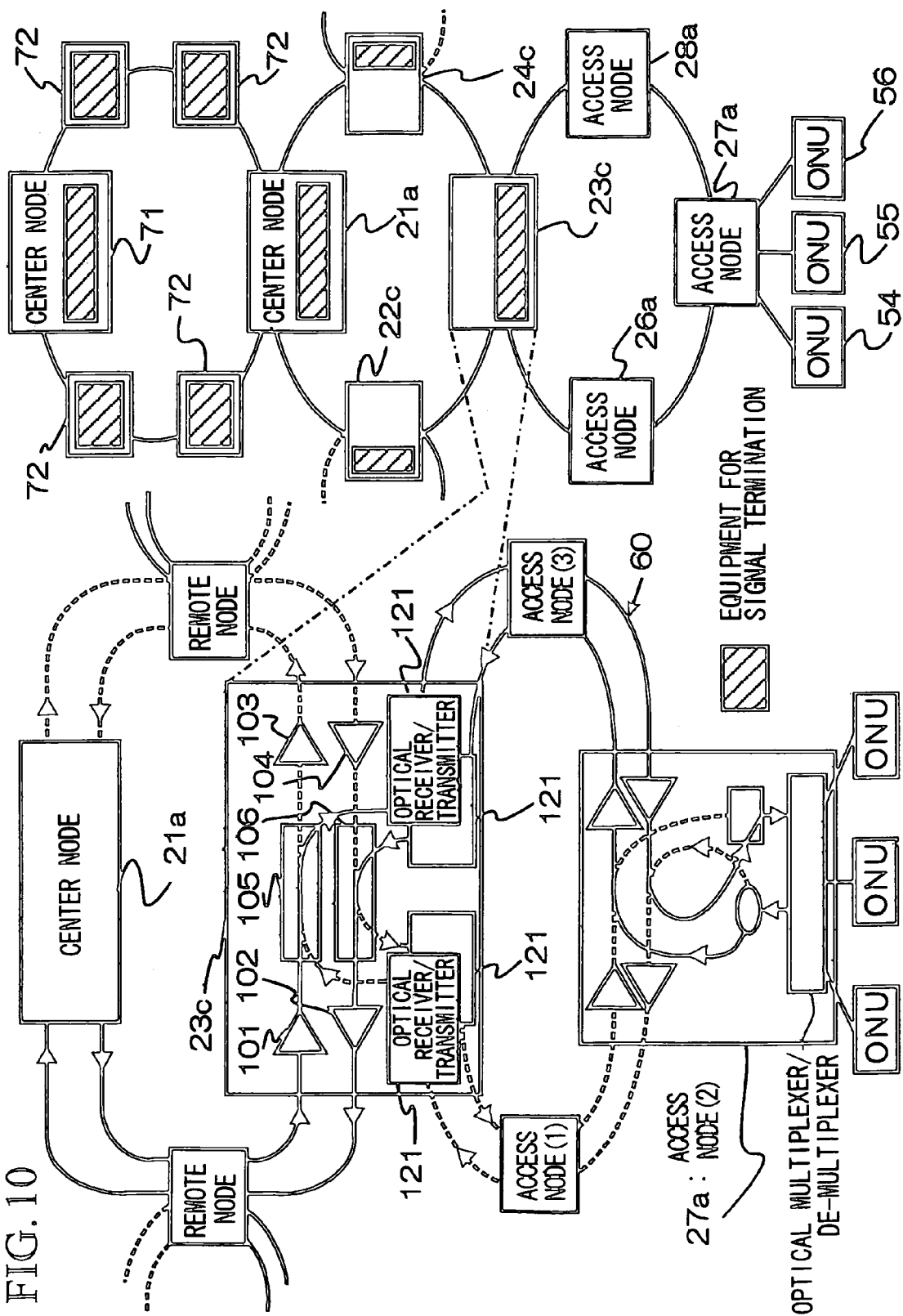
FIG. 10 is a block diagram showing the constitution of a sixth embodiment of this invention.

FIG. 10 shows another embodiment in which an optical signal is converted to an electrical signal by using transponders 121, 121, 121, and 121, in a remote node 23c corresponding to the remote node 23a of FIG. 3. The constitution is the same as that shown in FIG. 9, with the exception that the access nodes (1) to (3) and the remote node 23c are connected in a ring.

In the example shown in FIG. 10, remote nodes 22c and 24c have the same constitution as the remote node 23c, and are provided in the ring network comprising the center node 21a and the remote node 23c. A center node 71 and a plurality of remote nodes 72, 72, . . . are provided in the higher level ring network comprising the center node 21a.

Embodiment 7

Figure 11:
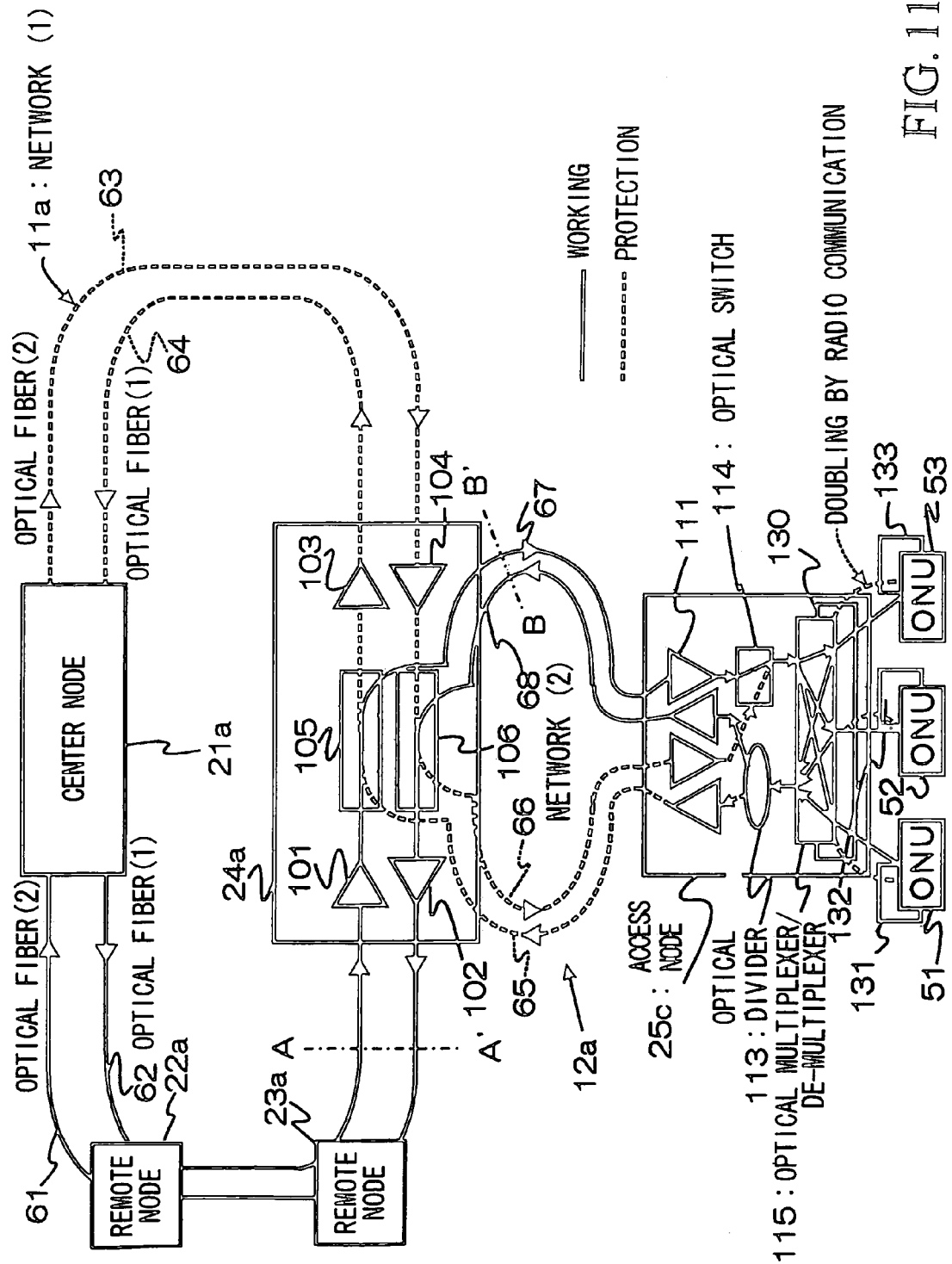
FIG. 11 is a block diagram showing the constitution of a seventh embodiment of this invention.

FIG. 11 shows an embodiment in which communication between the access node 25c (corresponding to the access node 25a of FIG. 2) and the ONU 51, 52, and 53, is doubled by using radio communication (radio receiver/sender 130, 131, 132, and 133). When communication is doubled by using radio, all the paths which join the ONU 51, 52 and 53 to the center node 21a can be doubled inexpensively. FIG. 11 shows only a two-fiber unidirectional ring, but this constitution can be applied to all networks in the embodiments of this invention. The operations when the optical cable becomes severed at points AA' and BB' (not shown in FIG. 11) are the same as those described in the first embodiment.

Embodiment 8

Figure 12:
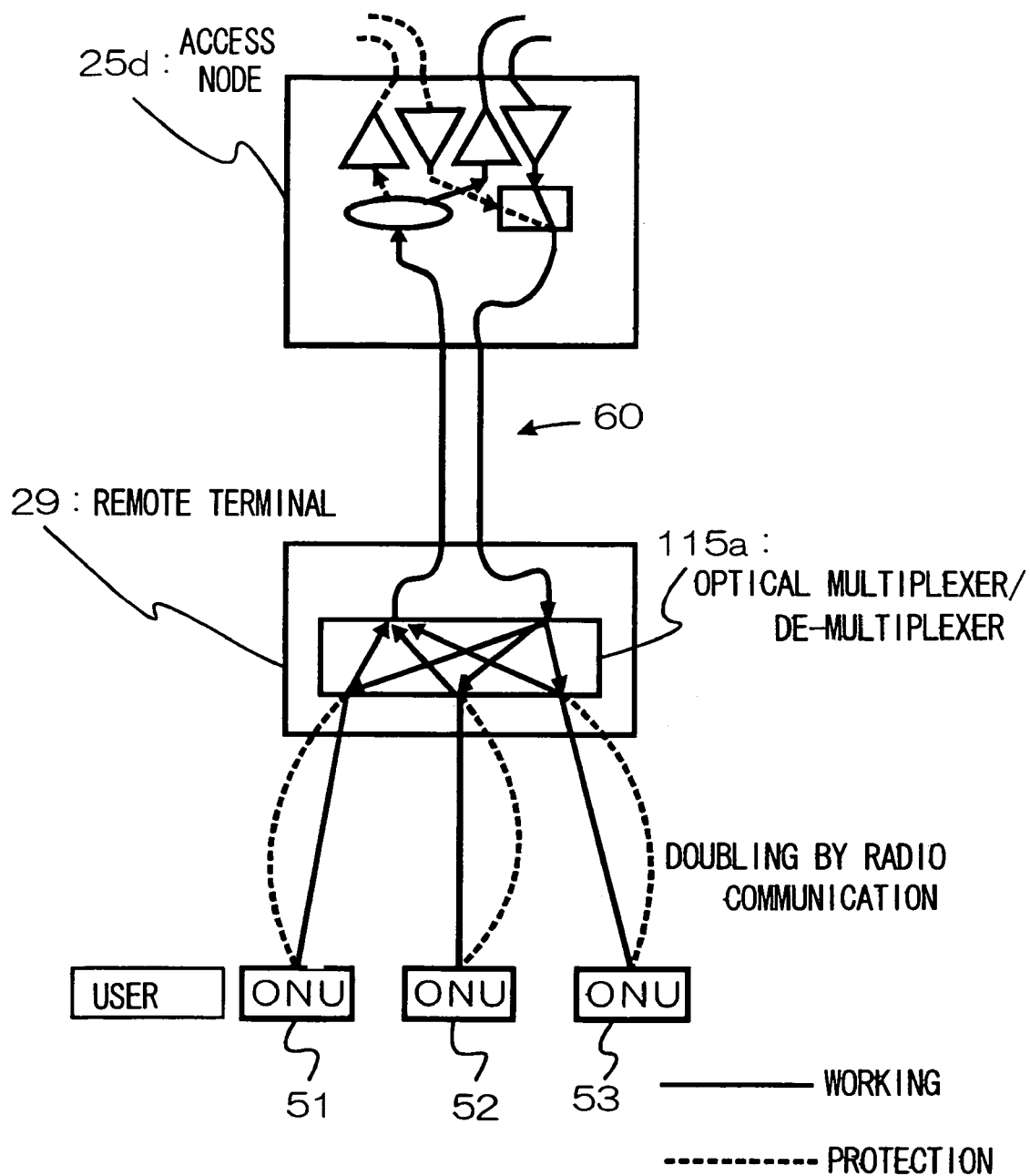
FIG. 12 is a block diagram showing the constitution of an eighth embodiment of this invention.

FIG. 12 shows an embodiment in which the optical multiplexer/de-multiplexer 115a is provided at a remote terminal 29 near the user, instead of at the access node 25d (corresponding to the access node 25a of FIG. 2). In this embodiment, the constitution of the network above the access node 25d can be applied in all of the embodiments of this invention. By providing the optical multiplexer/divider nearer to the ONU, the cost of establishing the path can be reduced. The operations when the optical cable becomes severed at points AA' and BB' (not shown in FIG. 12) are the same as those described in the first embodiment.

Embodiment 9

Figure 15:
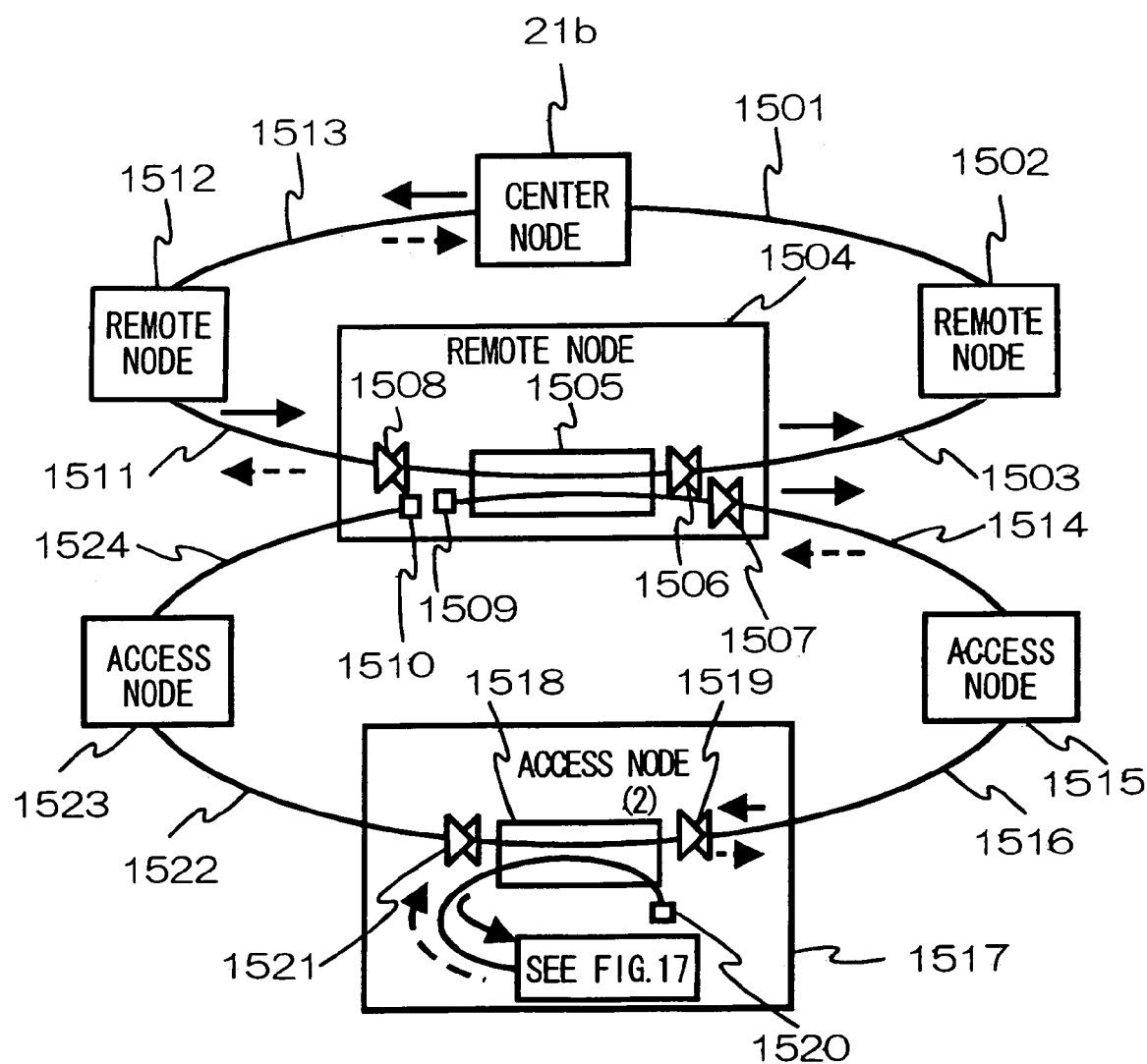
FIG. 15 is a block diagram showing the constitution of a ninth embodiment of this invention.
Figure 16:
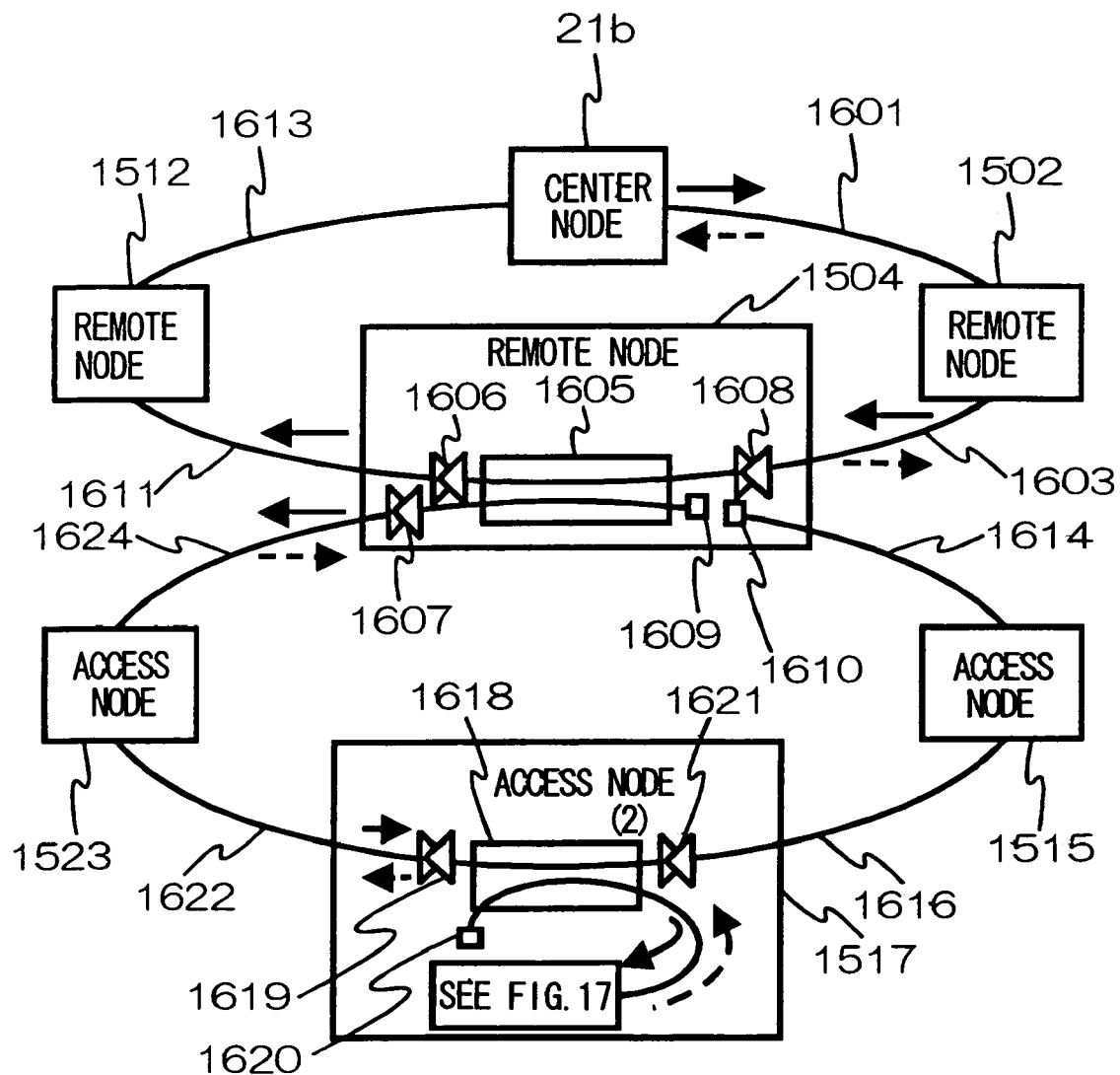
FIG. 16 is a block diagram showing the constitution of the ninth embodiment of this invention.
Figure 17:
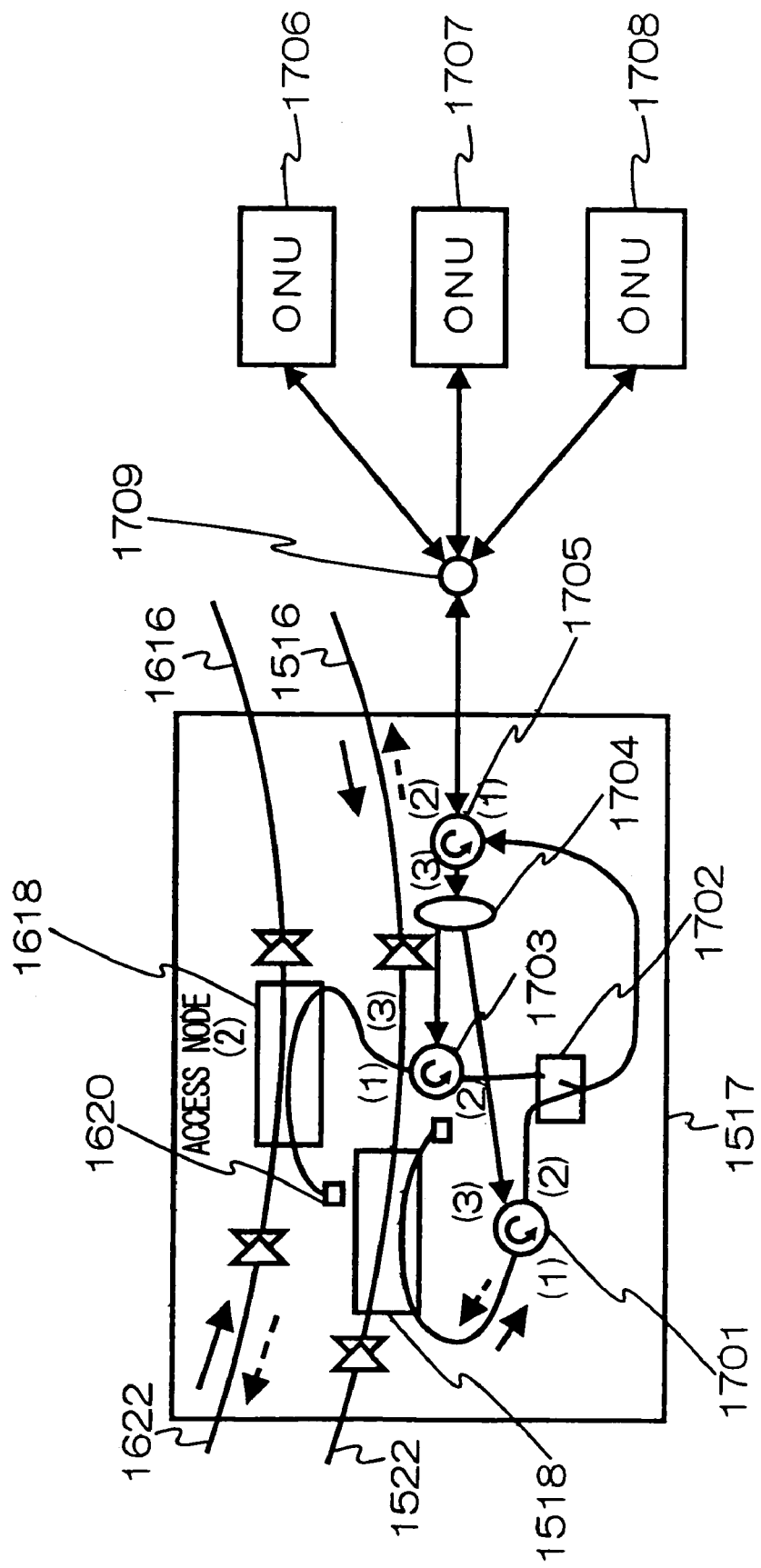
FIG. 17 is a block diagram showing the constitution of the ninth embodiment of this invention.

FIGS. 15 to 17 show an embodiment wherein, at the remote nodes (offices) which belong to the lower level ring network comprising the access node and the higher level ring network, both ends of two loop-like optical fibers (one working fiber and one protection fiber) which join the access nodes belonging to the lower level ring network are open (specifically, between the optical terminators 1509 and 1510 of the working fiber, and between the optical terminators 1609 and 1610 of the protection fiber). Instead of providing an optical multiplexer/de-multiplexer having wavelength selectability at the access nodes or the above remote nodes (offices), the ONU themselves have an optical de-multiplexing function. Further, the wavelength division multiplexing signals which are transmitted along the two optical fibers used in the ring networks are all bi-directional, and bi-directional optical amplifiers are used in the remote nodes and the access nodes. FIGS. 15 to 17 show a case where, in the higher level ring network comprising the center node 21b, the optical signal from the center node 21b to the remote node 1504 is transmitted in the opposite direction to the optical signal from the remote node 1504 to the center node 21b, i.e. a bi-directional ring. In FIG. 15, fibers 1501, 1503, 1511, 1513, 1514, 1516, 1522, and 1524 are working fibers, and in FIG. 16, fibers 1601, 1603, 1611, 1613, 1614, 1616, 1622, and 1624 are protection fibers. Firstly, signal transmission on the working fibers 1501, 1503, 1511, 1513, 1514, 1516, 1522, and 1524 will be explained. A signal is transmitted counterclockwise from the center node 21b to the remote node 1504. A fiber coupler 1505 is provided at the remote node 1504, and divides the signal, which is then transmitted to the lower level ring network comprising the access node 1517. In the access node 1517 shown in FIG. 17, the received optical wavelength division multiplexing signal is divided by the fiber coupler 1518 and received. One end of the fiber coupler 1518 functions as an optical terminator 1520. The optical wavelength division multiplexing signal which was divided at the access node 1517 is led to an optical switch 1702 by a circulator 1701, and then led to a star coupler 1709 by another optical circulator 1705. The star coupler 1709 distributes the signal to the ONU 1706, 1707, and 1708. The ONU 1706, 1707, and 1708 de-multiplex and receive only signals at wavelengths allocated to the ONU. It is a major feature of this embodiment that the ONU 1706, 1707, and 1708 have the ability to de-multiplex signals. No optical de-multiplexers having wavelength selectability, such as an AWG, are provided in the access node 1517 and the remote node 1504. Instead, the ONU 1706, 1707, and 1708 themselves are able to de-multiplex wavelengths.

In this example, the optical circulators 1701, 1703, and 1705 comprise optical circuits in which an optical signal which has been input from a port (1) is output from a port (2), an optical signal which has been supplied from the port (2) is output from a port (3), and an optical signal which has been supplied from the port (3) is output from the port (1).

As in the embodiments described above, when transmitting from the ONU 1706, 1707, and 1708 to the center node 21b, the ONU 1706, 1707, and 1708 use predetermined wavelengths. In contrast to the above embodiments, the signals transmitted from the ONU 1706, 1707, and 1708 are multiplexed by the star coupler 1709. Thereafter, an optical circulator 1705, an optical divider 1704, and another optical circulator 1701 transmit the signal in the opposite direction to that received on the optical fiber.

Another important feature of this embodiment is that both ends of the looped optical fibers 1514, 1516, 1522, and 1524 which join the access nodes 1515, 1517, and 1523, to the remote node 1504 are opened by optical terminators 1509 and 1510 in the remote node 1504. This is to prevent the optical signals from passing around the lower level ring network which the access node 1517 belongs to.

Subsequently, in the protection system shown in FIG. 16, the signals are transmitted in the opposite direction to that in FIG. 15. The open ends of the loop in the remote node 1504 (optical terminators 1609 and 1610) are also provided at opposite positions. The operation of the optical switch 1702 provided at the access node 1517 is the same as the embodiments described above. The access node in this embodiment comprises an optical circulator, but an optical coupler may alternatively be used.

In FIGS. 15 to 17, reference numerals 1505, 1518, 1605, and 1618 represent two-by-two optical fiber couplers, reference numerals 1506, 1507, 1508, 1519, 1521, and 1606, 1607, 1608, 1619, and 1621 represent bi-directional optical amplifiers, reference numerals 1502 and 1512 represent remote nodes, reference numerals 1515 and 1523 represent access nodes, and reference numeral 1620 represents an optical terminator. The solid-line arrows show the direction of the optical signals which are transmitted from the center node toward the ONU, and the broken-line arrows show the direction of the optical signals which are transmitted from the ONU toward the center node. The operations in the cases where the optical cable becomes severed at the points AA' and BB' (not shown in FIGS. 15 to 17) are the same as that already described in the second embodiment.

Figure 18:
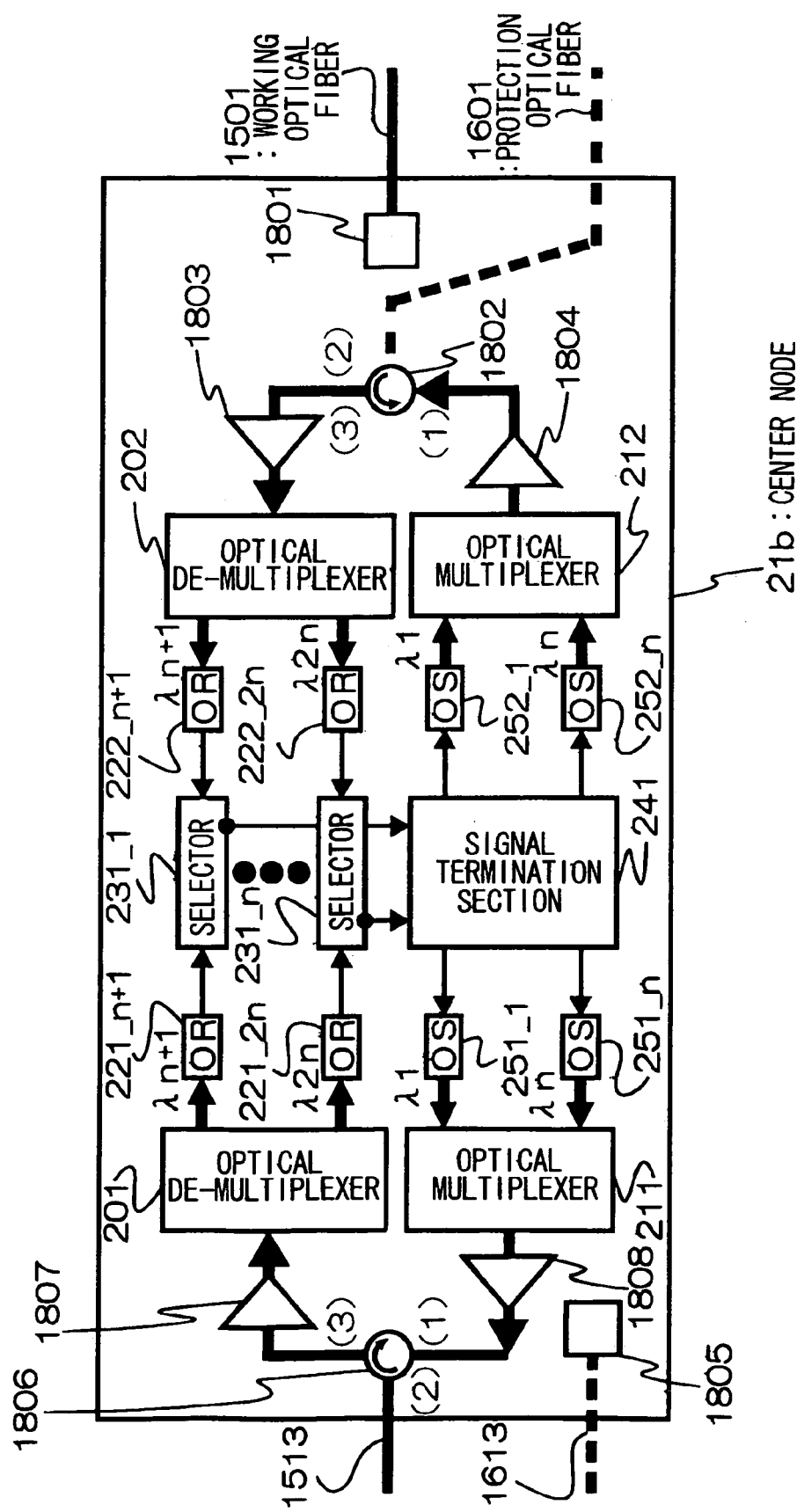
FIG. 18 is a block diagram showing the constitution of the center node 21b of FIGS. 15 to 17.

FIG. 18 shows one example of the constitution of the center node 21b according to this embodiment. In the constitution of the center node 21b shown in FIG. 18, parts which are identical to those in the constitution of the center node 21a shown in FIG. 4 are represented by the same reference numerals, and will not be explained further. The center node 21b shown in FIG. 18 comprises an optical terminator 1801 which terminates the working fiber 1501 shown in FIG. 15, an optical circulator 1802 connected to the protection fiber 1601 of FIG. 16, an optical amplifier 1803 having an input terminal connected to the port (3) of an optical circulator 1802, an optical amplifier 1804 having an output terminal connected to the port (1) of the optical circulator 1802, an optical terminator 1805 which terminates the protection fiber 1613 shown in FIG. 16, an optical circulator 1806 which is connected to the working fiber 1513 of FIG. 15, an optical amplifier 1807 having an input terminal connected to the port (3) of the optical circulator 1806, and an optical amplifier 1808 having an output terminal connected to the port (1) of the optical circulator 1806. In this case, the output of the optical amplifier 1803 connects to the input of the optical de-multiplexer 202, the input of the optical amplifier 1804 connects to the output of the optical multiplexer 212, the output of the optical amplifier 1807 connects to the input of the optical de-multiplexer 201, and the input of the optical amplifier 1808 connects to output of the optical multiplexer 211. Incidentally, the optical amplifiers 1803, 1804, 1807, and 1808 need only be provided as necessary.

Embodiment 10

Figure 19:
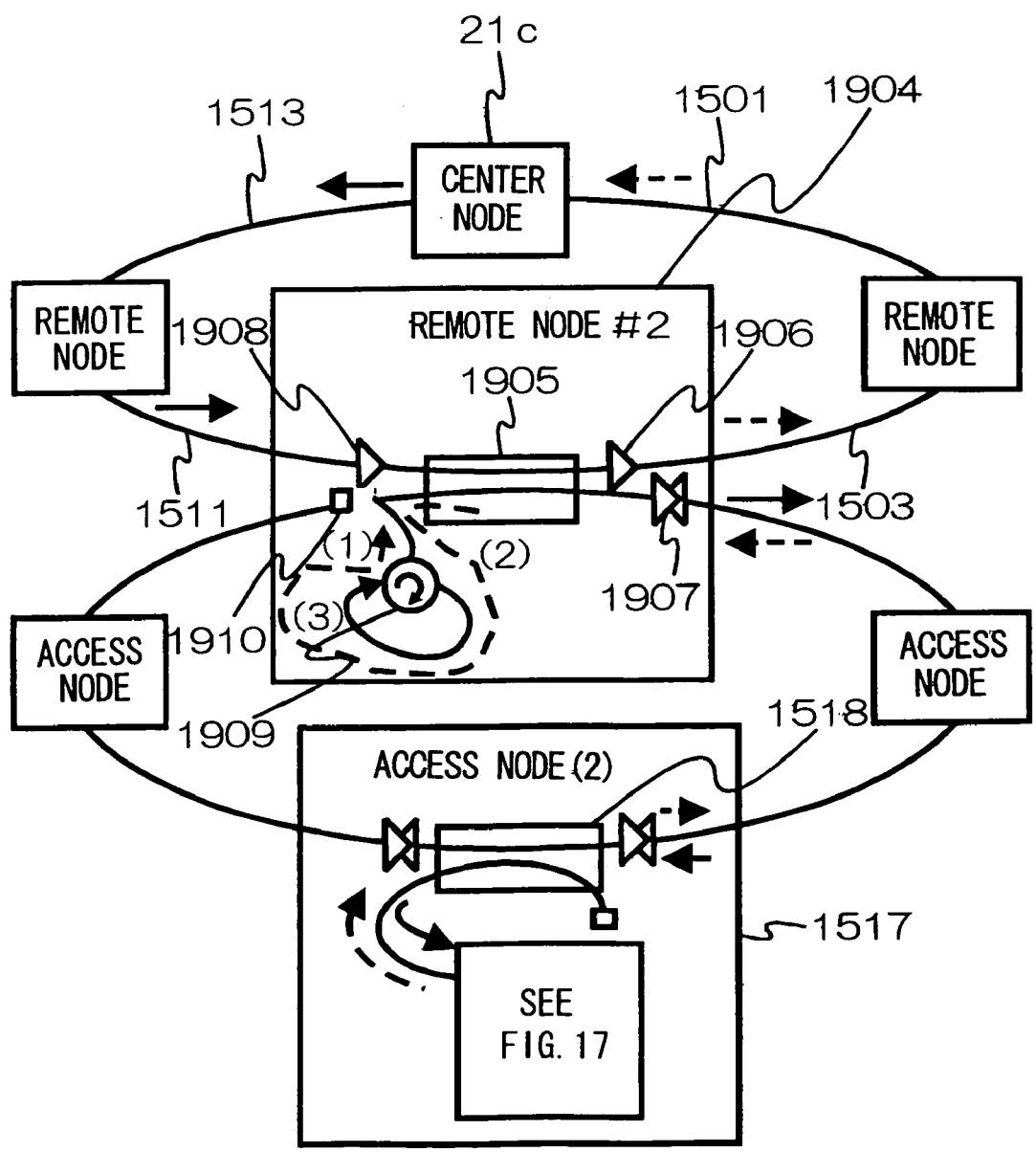
FIG. 19 is a block diagram showing the constitution of a tenth embodiment of this invention.
Figure 20:
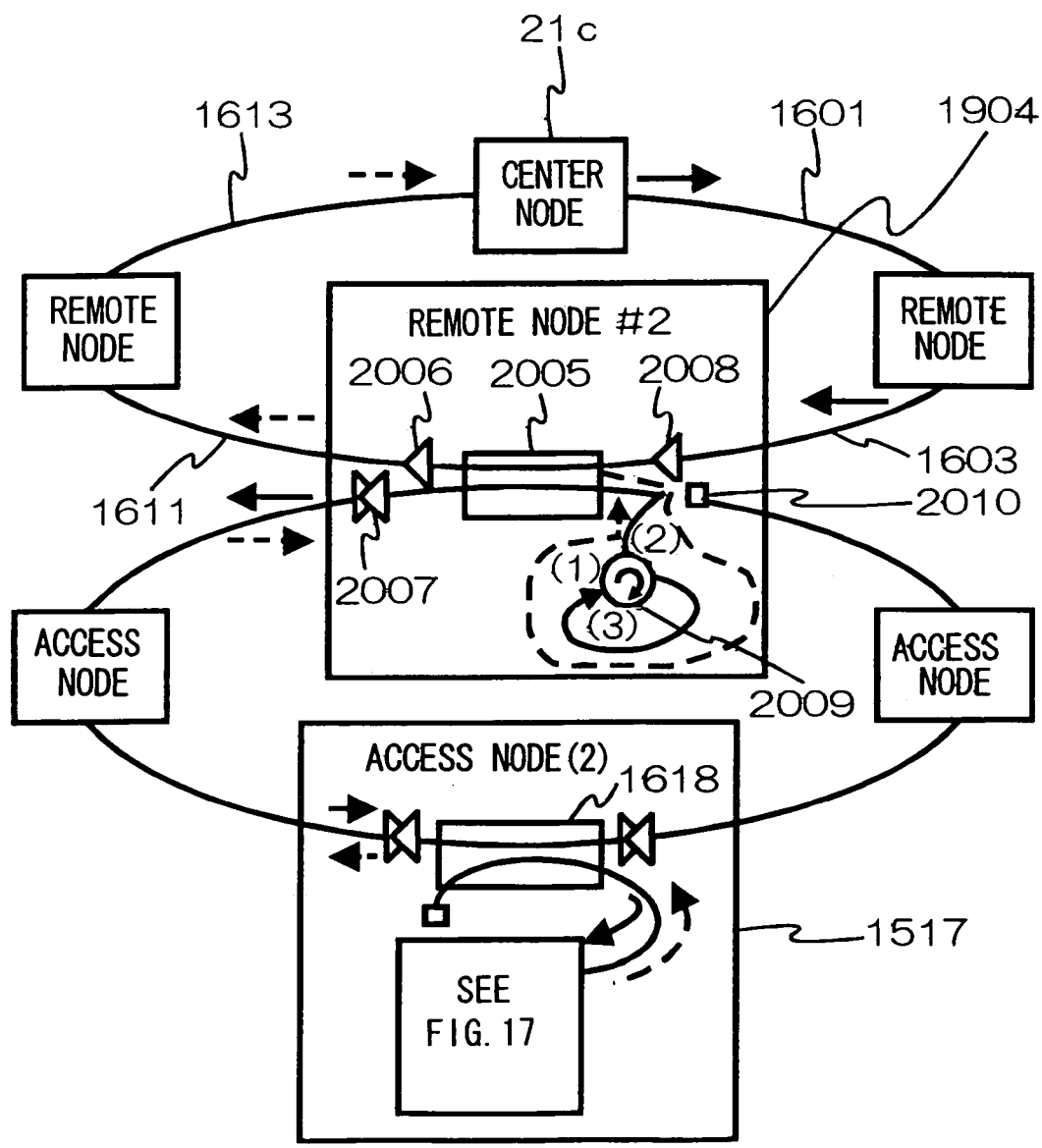
FIG. 20 is a block diagram showing the constitution of the tenth embodiment of this invention.

FIGS. 19 and 20 show embodiments of the present invention. FIGS. 19 and 20 show the case where, in the higher level ring network comprising the center node 21c, the direction of the optical signal which transmits data from the center node 21c to the remote node 1904 is the same as the direction of the optical signal which transmits data from the remote node 1904 to the center node 21c, i.e. the network is a unidirectional ring. FIG. 19 shows a working fiber, and FIG. 20 shows a protection fiber.

Figure 21:
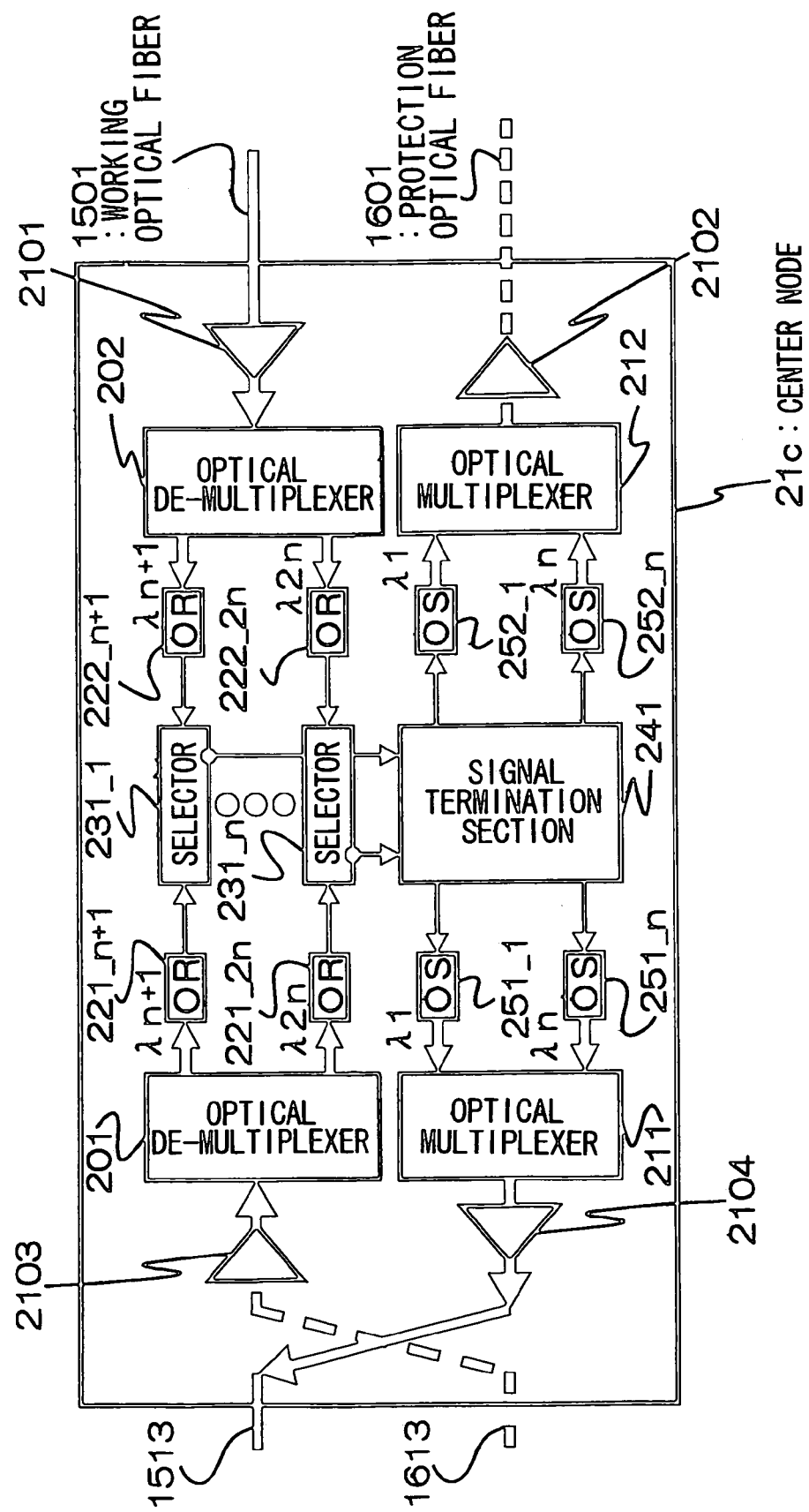
FIG. 21 is a block diagram showing the constitution of the center node 21c of FIGS. 19 to 20.

As in FIGS. 15 to 17, solid-line arrows and broken-line arrows are used to represent examples of the directions of signals transmitted from the center node 21c via the remote node #2 (1904) to the ONU belonging to the access node 2 (1517). FIGS. 19 and 20 differ from FIGS. 15 to 17 in that (i) bi-directional optical amplifiers are not needed in the higher level ring network, and (ii) the remote node 1904 comprises optical circulators 1909 and 2009. FIG. 21 shows an example of the constitution of the center node used here.

In FIGS. 19 and 20, reference numerals 1905 and 2005 represent two-by-two optical fiber couplers, reference numerals 1907 and 2007 represent bi-directional optical amplifiers, reference numerals 1906, 1908, 2006, and 2008 represent (unidirectional) optical amplifiers, reference numerals 1910 and 2010 represent optical terminators, and reference numerals 1909 and 2009 represent optical circulators which connect the port (1) to the optical fiber couplers 1905 and 2005, and connect the port (2) to the port (3). The operations in the cases where the optical cable becomes severed at the points AA' and BB' (not shown in FIGS. 19 to 20) are the same as that already described in the second embodiment. The center node 21c shown in FIG. 21 comprises an optical amplifier 2101 which inputs signals from the working fiber 1501 and outputs signals to the optical de-multiplexer 202, an optical amplifier 2102 which outputs signals to the protection fiber 1601 and inputs signals from the optical multiplexer 212, an optical amplifier 2103 which inputs signals from the optical fiber 1613 and outputs signals to the optical de-multiplexer 201, and an optical amplifier 2104 which outputs signals to the optical fiber 1513 and inputs signals from the optical multiplexer 211. The optical amplifiers 2101 to 2104 may be provided where necessary.

Embodiment 11

Figure 22:
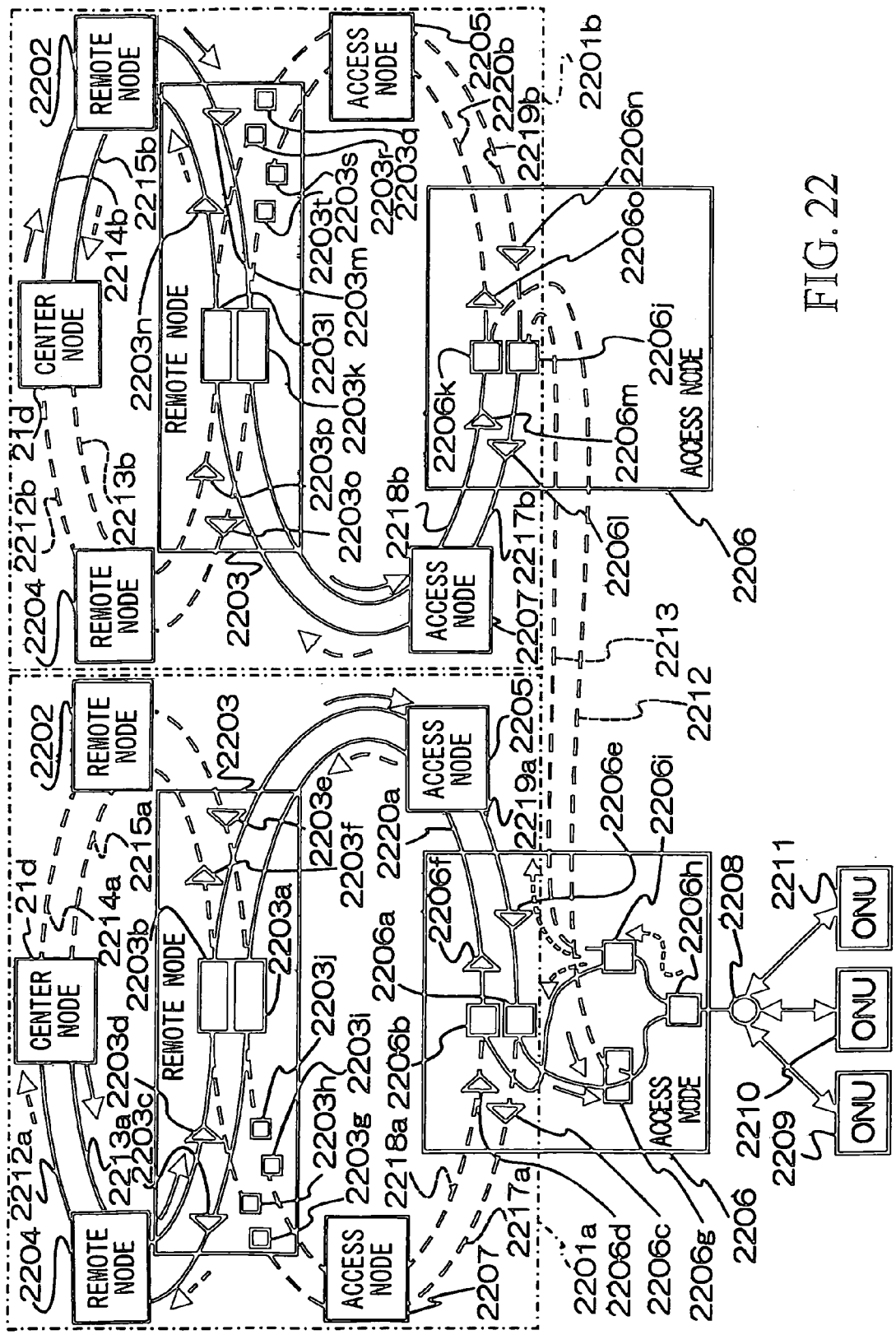
FIG. 22 is a block diagram showing the constitution of an eleventh embodiment of this invention.

FIG. 22 shows an embodiment comprising a three-layered optical network in which the highest level network is a ring network comprising one center node and two or more remote nodes, which are joined by four optical fibers. The intermediate level network comprises a ring network having a node belonging to the higher level network as its center node. Access nodes belonging to the ring network are joined by four optical fibers. The lowest level network comprises a star network centered around an access node, which multiplexes traffic from ONU. The ONU and access node are each directly joined by one optical fiber. The center node belonging to the highest level network and the ONU establish a direct communication path by using lights of different wavelengths. The optical signals are not electrically processed, but are amplified, branched, or routed at the remote nodes and the access node provided therebetween. In addition, at the node belonging to the intermediate level ring network, both ends of the four looped optical fibers (two of the optical fibers corresponding to working fibers, and two corresponding to protection fibers) which join together the access nodes belonging to the lower level ring network, are open (between optical terminators 2203g and 2203h, and between 2203i and 2203j on the working fiber; between optical terminators 2203q and 2203r, and between 2203s and 2203t on the protection fiber). Furthermore, the access nodes and the remote nodes do not comprise optical multiplexer/de-multiplexers having the ability to select wavelengths. Instead, the ONU themselves having a wavelength de-multiplexing function. The block 2201a enclosed by the chain line comprises two working fibers, and the block 2201b comprises two protection fibers. The access node 2206 connects to four optical fibers. In the case shown in FIG. 22, the access node 2206 comprises an optical coupler 2206i, but an optical circulator may be used instead, as shown in FIG. 17. FIG. 22 shows a bi-directional ring network comprising two working fibers and two protection fibers, the signals to the ONU being transmitted in the opposite direction from signals transmitted from the ONU. This embodiment is characterized in that (i) both ends of the optical fibers which connect the access node in a ring are open at the remote node, preventing the signals from passing around the loop, and (ii) no optical multiplexer/de-multiplexer having wavelength selectability is used at the remote node and the access node. Instead, the ONU are able to select wavelengths for transmitting and receiving.

In FIG. 22, the solid lines represent optical fibers which are used in communication between the center node 21d and the access node 2206. The same applies in an embodiment subsequently described in FIG. 24. Reference numeral 21d represents the center node, reference numerals 2202, 2203, 2204 represent remote nodes, reference numerals 2212a, 2213a, 2219a, and 2220a represent ring-shaped optical fibers for working, reference numerals 2214a, 2215a, 2217a, and 2218a represent ring-shaped optical fibers for working, reference numerals 2212b, 2213b, 2219b, and 2220b represent ring-shaped optical fibers for protection, reference numerals 2214b, 2215b, 2217b, and 2218b represent ring-shaped optical fibers for protection, reference numerals 2203a and 2203b represent two-by-two fiber couplers, reference numerals 2203c, 2203d, 2203e, and 2203f represent optical amplifiers, reference numerals 2203g, 2203h, 2203i, and 2203j represent optical terminators where the fiber loop is open, reference numerals 2203k and 2203l represent two-by-two fiber couplers, reference numerals 2203m, 2203n, 2203o, and 2203p represent optical amplifiers, and reference numerals 2203q, 2203r, 2203s, and 2203t represent optical terminators where the fiber loop is open. Reference numerals 2205, 2206, and 2207 represent access nodes, reference numeral 2208 represents a star coupler, reference numerals 2209, 2210, and 2211 represent ONU, reference numerals 2212 and 2213 represent protection optical fibers, reference numerals 2206a, 2206b, 2206j, and 2206k represent two-by-two fiber couplers, reference numerals 2206c, 2206d, 2206e, 2203f, 2206l, 2206m, 2206n, and 2206o represent optical amplifiers, reference numeral 2206g represents an optical switch, and reference numerals 2206h represents an optical multiplexer/de-multiplexer. The solid-line arrows show the direction of the optical signals which are transmitted from the center node toward the ONU, and the broken-line arrows show the direction of the optical signals which are transmitted from the ONU toward the center node. The operations in the cases where the optical cable becomes severed at the points AA' and BB' (not shown in FIG. 22) are the same as that already described in the second embodiment.

Figure 23:
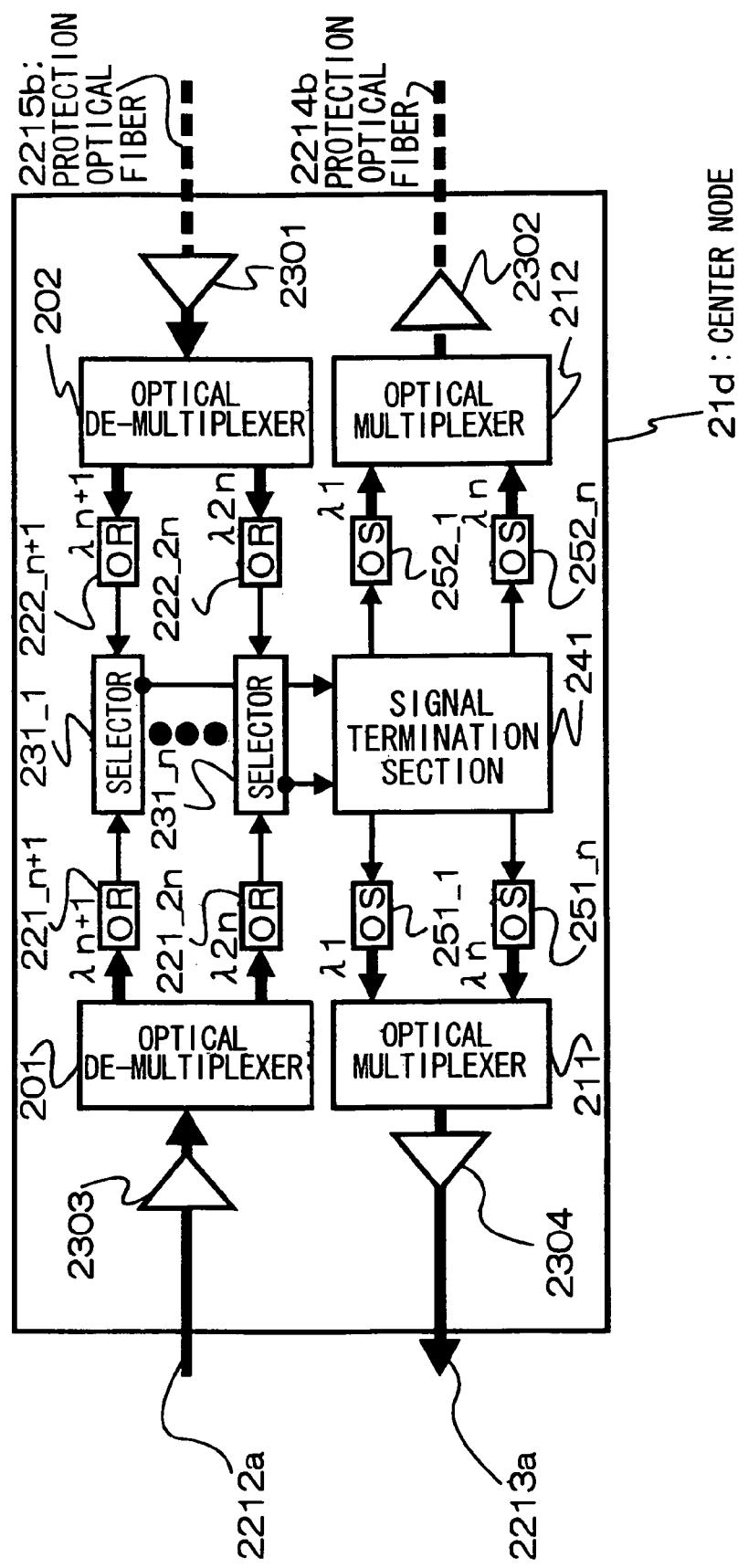
FIG. 23 is a block diagram showing the constitution of the center node 21d of FIG. 22.

FIG. 23 shows one example of the constitution of the center node in this embodiment. The center node 21d comprises an optical amplifier 2301 which inputs signals from the ring-shaped optical fiber 2215b and outputs signals to the optical de-multiplexer 202, an optical amplifier 2302 which outputs signals to the ring-shaped optical fiber 2214b and inputs signals from the optical multiplexer 212, an optical amplifier 2303 which inputs signals from the optical fiber 2212a and outputs signals to the optical de-multiplexer 201, and an optical amplifier 2304 which outputs signals to the optical fiber 2213a and inputs signals from the optical multiplexer 211. The optical amplifiers 2301 to 2304 may be provided where necessary.

Embodiment 12

Figure 24:
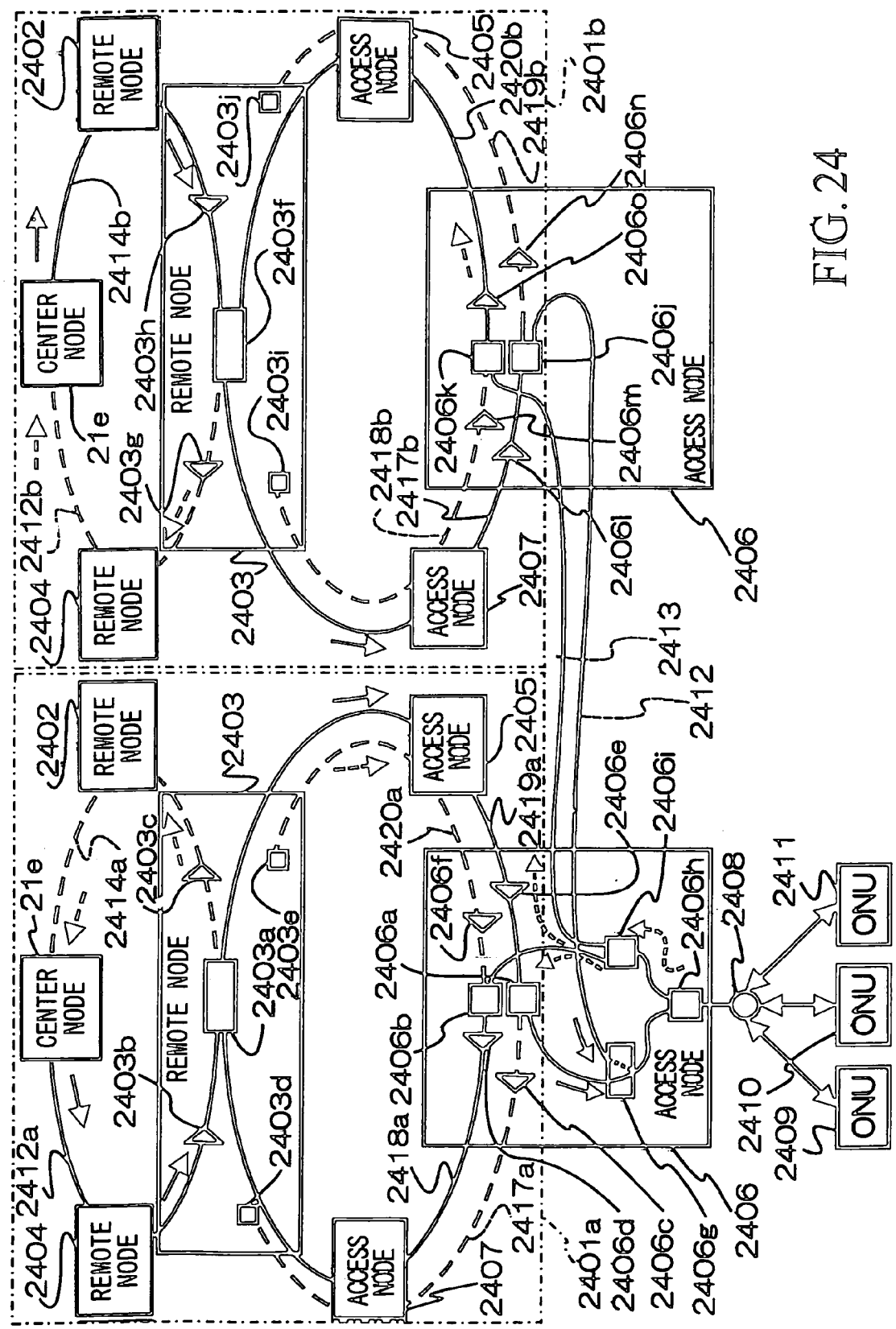
FIG. 24 is a block diagram showing the constitution of a twelfth embodiment of this invention.

FIG. 24 shows an embodiment of the present invention which provides an optical wavelength division multiplexing network comprising at least three layers. The highest level network comprises a ring network having at least one center node and two or more remote nodes which are joined by two optical fibers. The intermediate level network comprises a ring network having a node belonging to the higher level network as its center node. Access nodes belonging to the ring network are joined by four optical fibers. The lowest level network comprises a star network centered around an access node, which multiplexes traffic from ONU. The ONU and the access node are directly joined by one optical fiber. The center node belonging to the highest level network and the ONU establish a direct communication path by using lights of different wavelengths. The optical signals are not electrically processed at the remote nodes and the access nodes provided between the center node and the ONU. Instead, only the optical signals are amplified, divided, or routed. At a node (an office) belonging to the intermediate level ring network, one end of the four looped optical fibers (two for working, and two for protection) which join the access nodes belonging to the lower level ring network, are open (optical terminators 2403d and 2403e on the working fiber; optical terminators 2403i and 2403j on the protection fiber). Furthermore, the access nodes and the remote nodes (offices) do not comprise optical multiplexer/de-multiplexers having the ability to select wavelengths. Instead, the ONU themselves having a wavelength de-multiplexing function. The block 2401a enclosed by the chain line comprises the working fiber, and the block 2401b comprises the protection fiber. Four optical fibers connect the access nodes shown in the blocks 2401a and 2401b. In FIG. 24, the access node 2406 comprises an optical coupler 2406i, but an optical circulator may be used instead, as shown in FIG. 17. FIG. 24 shows a unidirectional ring network comprising two working/protection fibers, the signals to the ONU being transmitted in the same direction as signals transmitted from the ONU.

In FIG. 24, reference numeral 21e represents the center node, reference numerals 2402, 2403, 2404 represent remote nodes, reference numerals 2412a, 2418a, and 2419a represent ring-shaped optical fibers for working, reference numerals 2414a, 2417a, and 2420a represent ring-shaped optical fibers for working, reference numerals 2412b, 2418b, and 2419b represent ring-shaped optical fibers for protection, reference numerals 2414b, 2417b, and 2420b represent ring-shaped optical fibers for protection, reference numerals 2403a and 2403f represent two-by-two fiber couplers, reference numerals 2403b, 2403c, 2403g, and 2403h represent optical amplifiers, reference numerals 2403d, 2403e, 2403i, and 2403j represent optical terminators where the fiber loop is open, reference numerals 2405, 2406, and 2407 represent access nodes, reference numeral 2408 represents a star coupler, reference numerals 2409, 2410, and 2411 represent ONU, reference numerals 2412 and 2413 represent optical fibers for working, reference numerals 2406a, 2406b, 2406j, and 2406k represent two-by-two fiber couplers, reference numerals 2406c, 2406d, 2406e, 2406f, 2406l, 2406m, 2406n, and 2406o represent optical amplifiers, reference numeral 2406g represents an optical switch, and reference numerals 2406h represents an optical multiplexer/de-multiplexer. The solid-line arrows show the direction of the optical signals which are transmitted from the center node toward the ONU, and the broken-line arrows show the direction of the optical signals which are transmitted from the ONU toward the center node. Incidentally, the constitution of the center node 21e may be the same as, for example, that in FIG. 23. The operations in the cases where the optical cable becomes severed at the points AA' and BB' (not shown in FIG. 24) are the same as that already described in the second embodiment.

Embodiment 13

Figure 26:
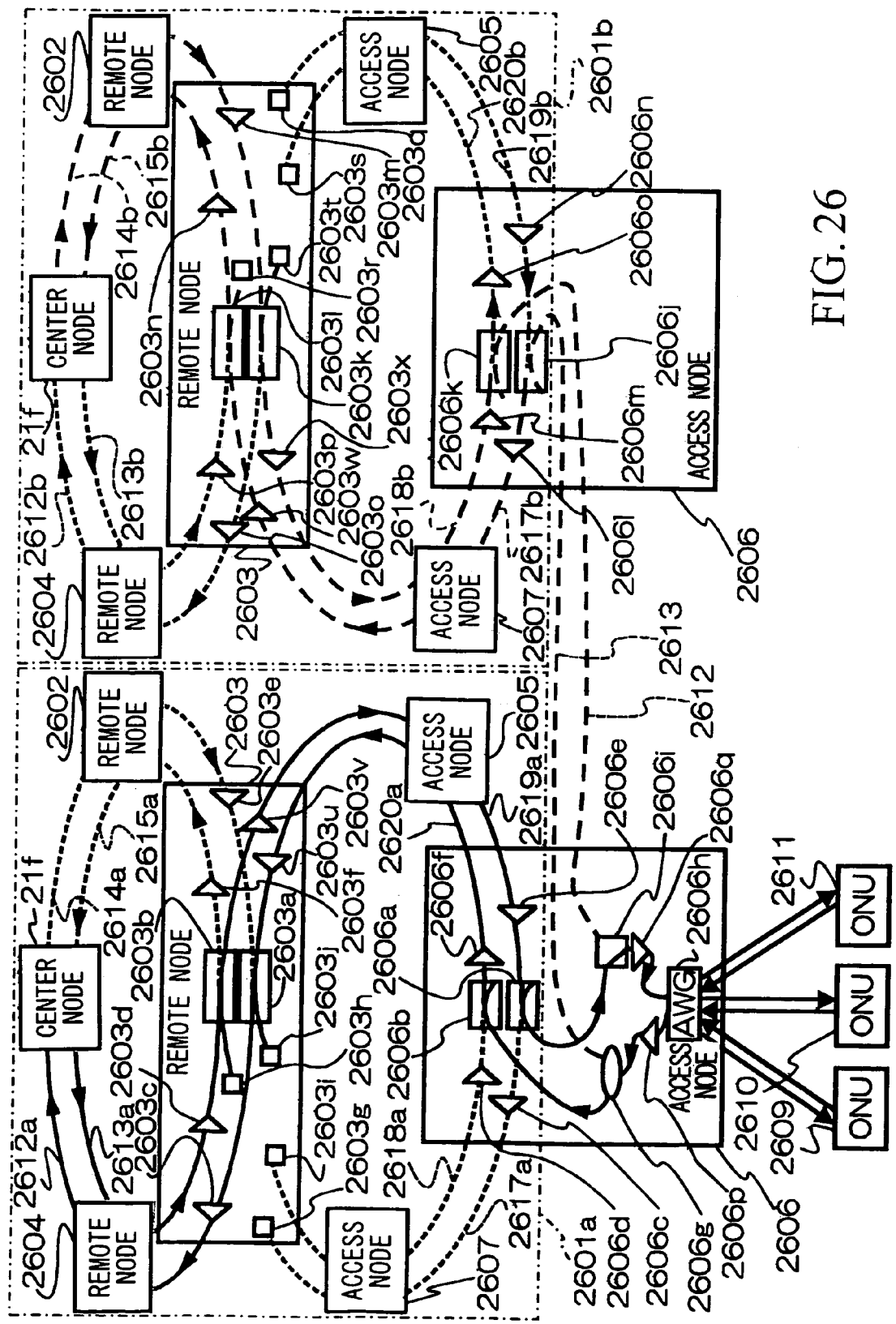
FIG. 26 is a block diagram showing the constitution of a thirteenth embodiment of this invention.

FIG. 26 shows an embodiment of a network. Two fibers which are usually used as working fibers are shown on the left side of FIG. 26, and the remaining two fibers which are used as protection fibers are shown on the right side. That is, the block 2601a enclosed by the chain line comprises the two working fibers, and the block 2601b comprises the two protection fibers. Four optical fibers connect the access node 2606.

In FIG. 26, the solid lines on the left side (working) of the diagram, and the thick dotted lines on the right (protection) side of the diagram represent optical fibers which are used in communications between the center node 21f and the access node 2606. The same applies in embodiments shown in FIGS. 27 and 28, which will be explained later. Reference numeral 21f represent the center node, reference numerals 2602, 2603, an 2604 represent the remote nodes which, with the center node 21f, comprise the higher level ring network, reference numerals 2612a, 2613a, 2614a, 2615a, 2617a, 2618a, 2619a, and 2620a represent ring optical fibers for working, reference numerals 2612b, 2613b, 2614b, 2615b, 2617b, 2618b, 2619b, and 2620b represent ring optical fibers for protection, reference numerals 2603a and 2603b represent two-by-two couplers, reference numerals 2603c, 2603d, 2603e, 2603f, 2603u, and 2603v represent optical amplifiers, reference numerals 2603g, 2603h, 2603i, and 2603j represent optical terminators where the fiber loop is open, reference numerals 2603k and 2603l represent two-by-two fiber couplers, reference numerals 2606m, 2606n, 2606o, 2606p, 2606w, and 2606x represent optical amplifiers, reference numerals 2603q, 2603r, 2603s, and 2603t represent optical terminators where the fiber loop is open. Reference numerals 2605, 2606, and 2607 represent access nodes which, with the remote node 2603, comprise the lower level ring network, reference numerals 2609, 2610, and 2611 represent ONU, reference numerals 2612 and 2613 represent optical fibers for protection, reference numerals 2606a, 2606b, 2606j, and 2606k represent two-by-two fiber couplers, reference numerals 2606c, 2606d, 2606e, 2606f, 2606l, 2606m, 2606n, 2606o, 2606p, and 2606q represent optical amplifiers, reference numeral 2606g represents an optical divider, reference numerals 2606h represents an AWG, and reference numerals 2606i represents an optical switch. Incidentally, the constitution of the center node 21f may be the same as, for example, that in FIG. 23.

FIG. 26 shows communication from the center node 21f, via the remote node 2603, to the ONU 2609, 2610, and 2611 belonging to the access node 2606. The working network shown on the left side of FIG. 26 will be explained. The center node 21f allocates wavelengths to the ONU 2609, 2610, and 2611 belonging to the access node 2606, and transmits signals to the remote nodes 2602, 2603, and 2604 in the higher level network by using the fiber 2613a. At the remote nodes 2602, 2603, and 2604, the optical couplers branch the optical wavelength division multiplexing signals which have been transmitted. Taking the remote node 2603 by way of example, the remote node 2603 transmits the branched signals to the access nodes 2605, 2606, and 2607 belonging to the lower level ring network. At the access nodes 2605, 2606, and 2607 belonging to the lower level ring network, the optical wavelength division multiplexing signals transmitted from the center node 21f are divided by using an optical coupler. Taking the access node 2606 by way of example, the optical wavelength division multiplexing signals from the center node 21f which have been divided by the optical coupler 2606a are divided by the AWG 2606h, separated into the allocated wavelengths, and received at the ONU 2609, 2610, and 2611. The ONU 2609, 2610, and 2611 transmit to the AWG 2606h by using the same wavelength as that received. The AWG 2606h is connected to each ONU 2609, 2610, and 2611 by two optical fibers, one for receiving down signals and one for up signals to the center node. The wavelengths allocated to the ONU 2609, 2610, and 2611 are such that they are not output from adjacent output ports of the AWG 2606h. The optical fibers which transmit the up signal are connected to ports adjacent to the down signal output port of the AWG 2606h. As a consequence, the signals from the ONU 2609, 2610, and 2611 are multiplexed and transmitted from the access node 2606 to the center node 21f. The signals transmitted from the access node 2606 to the center node 21f are coupled by the optical coupler 2606b, and transmitted to the remote node 2603. In the same way, up signals from the ONU belonging to the lower level network are multiplexed at the remote node 2603, and transmitted by using the optical fiber 2612a to the center node 21f. In this embodiment, the optical wavelength division multiplexing signals are transmitted on the fibers 2613a and 2612a in the higher level network in opposite directions.

At the access node 2606, the optical switch 2606i is provided in the input section for the down signal to the AWG 2606h, in order to switch to the protection system in the case where the fiber becomes severed. Furthermore, the optical divider 2606g is provided in the output section for the up signal from the AWG 2606h, in order to transmit the up signal on both the working and protection fibers. As already explained, the working and protection signals are selected in the center node 21f.

This embodiment is characterized in that (i) there is no switching at the remote nodes when the fiber becomes severed, and (ii) the optical signal is not electrically processed at the nodes (offices) provided between the ONU and the center node. Incidentally, the operations in the cases where the optical cable becomes severed at the points AA' and BB' (not shown in FIG. 26) are the same as that already described in the second embodiment.

Embodiment 14

Figure 27:
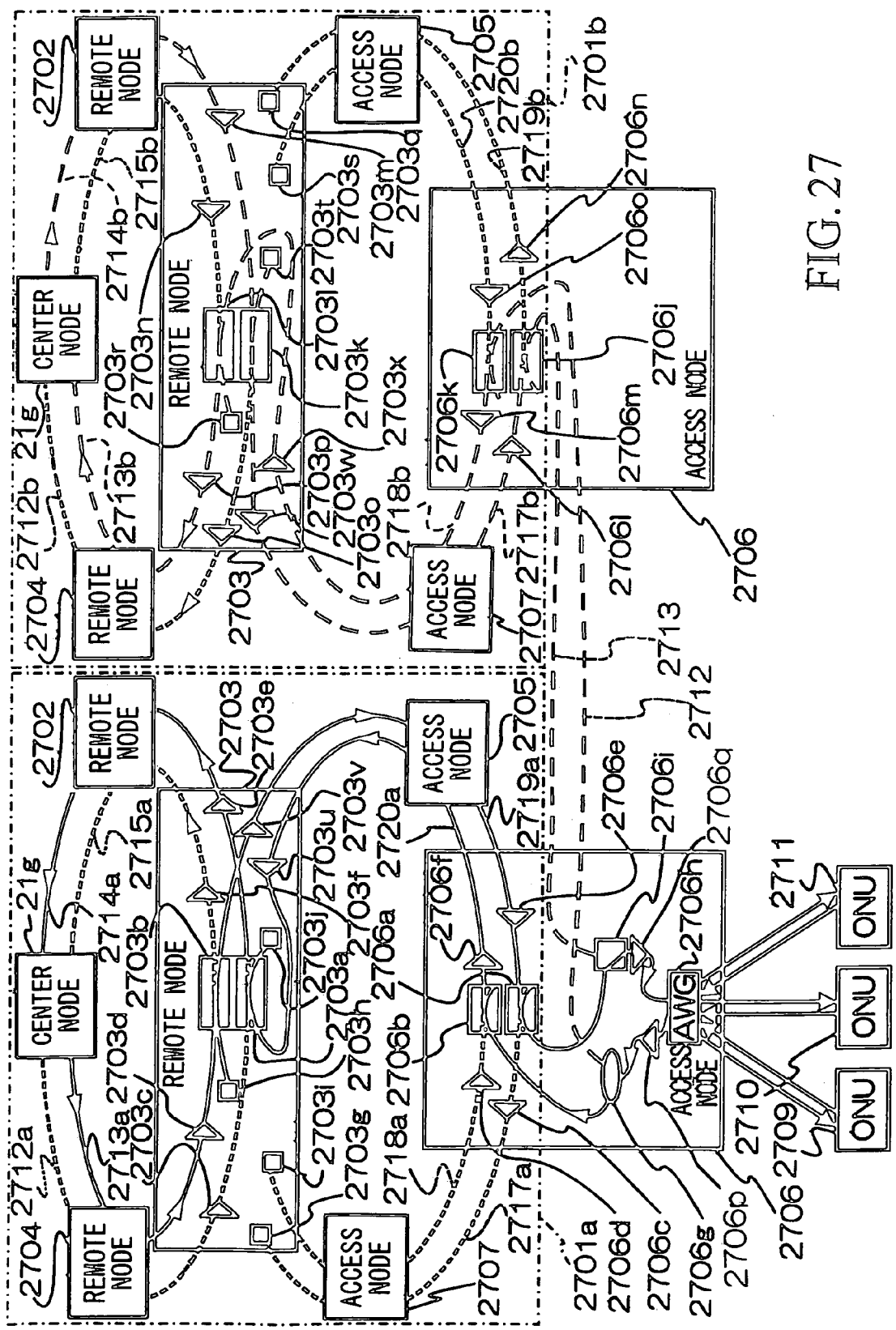
FIG. 27 is a block diagram showing the constitution of a fourteenth embodiment of this invention.

FIG. 27 shows an embodiment of the present invention. This embodiment differs from that shown in FIG. 26 in that, in the higher level ring network, the up and down signals are transmitted in the same direction.

In FIG. 27, the block 2701a enclosed by the chain line comprises the two working fibers, and the block 2701b comprises the two protection fibers. Four optical fibers connect the access node 2706. The reference numeral 21g represents the center node, reference numerals 2702, 2703, and 2704 represent remote nodes comprising, with the center node 21g, the higher level ring network, reference numerals 2712a, 2713a, 2714a, 2715a, 2717a, 2718a, 2719a, and 2720a represent ring-shaped optical fibers for working, reference numerals 2712b, 2713b, 2714b, 2715b, 2717b, 2718b, 2719b and 2720b represent ring-shaped optical fibers for protection, reference numerals 2703a and 2703b represent two-by-two fiber couplers, reference numerals 2703c, 2703d, 2703e, 2703f, 2703u, and 2703v represent optical amplifiers, reference numerals 2703g, 2703h, 2703i, and 2703j represent optical terminators where the fiber loop is open, reference numerals 2703k and 2703l represent two-by-two fiber couplers, reference numerals 2703m, 2703n, 2703o, 2703p, 2703w, and 2703x represent optical amplifiers, and reference numerals 2703q, 2703r, 2703s, and 2703t represent optical terminators where the fiber loop is open. Reference numerals 2705, 2706, and 2707 represent access nodes which, with the remote node 2703, comprise the lower level ring network, reference numerals 2709, 2710, and 2711 represent ONU, reference numerals 2712 and 2713 represent optical fibers for protection, reference numerals 2706a, 2706b, 2706j, and 2706k represent two-by-two fiber couplers, reference numerals 2706c, 2706d, 2706e, 2706f, 2706l, 2706m, 2706n, 2706o, 2706p and 2706q represent optical amplifiers, reference numeral 2706g represents an optical divider, reference numeral 2706h represents an AWG, and reference numeral 2706i represents an optical switch. Incidentally, the constitution of the center node 21g may be the same as, for example, the center node shown in FIG. 21. The operations in the cases where the optical cable becomes severed at the points AA' and BB' (not shown in FIG. 27) are the same as that already described in the second embodiment.

Embodiment 15

Figure 28:
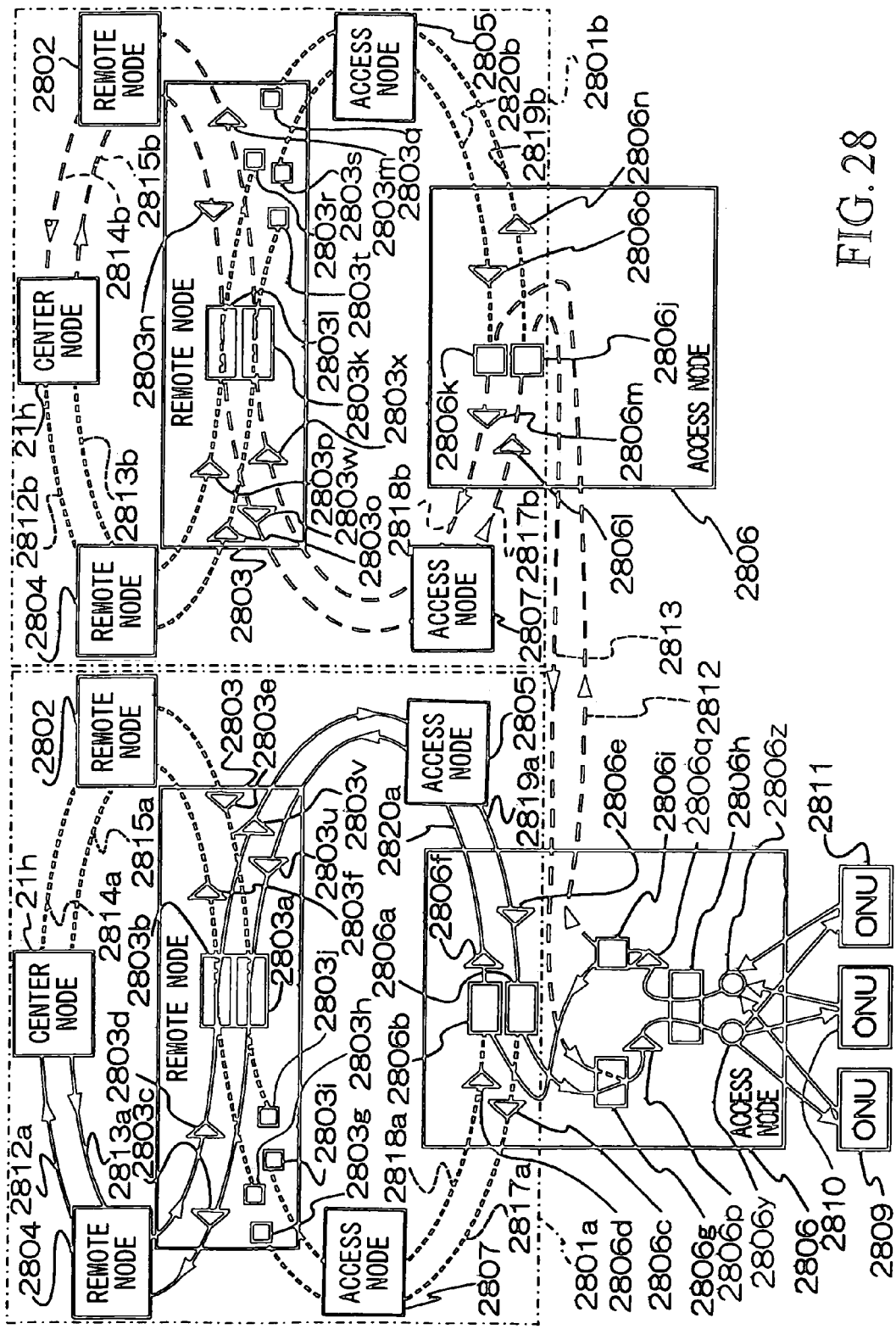
FIG. 28 is a block diagram showing the constitution of a fifteenth embodiment of this invention.

FIG. 28 shows an embodiment of the present invention. With the exception of the constitution of the access node, this embodiment is identical to that of FIG. 26. In FIG. 28, the block 2801a enclosed by the chain line comprises the two working fibers, and the block 2801b comprises the two protection fibers. Four optical fibers connect the access node 2806. The reference numeral 21h represents the center node, reference numerals 2802, 2803, and 2804 represent remote nodes comprising, with the center node 21h, the higher level ring network, reference numerals 2812a, 2813a, 2814a, 2815a, 2817a, 2818a, 2819a, and 2820a represent ring-shaped optical fibers for working, reference numerals 2812b, 2813b, 2814b, 2815b, 2817b, 2818b, 2819b and 2820b represent ring-shaped optical fibers for protection, reference numerals 2803a and 2803b represent two-by-two fiber couplers, reference numerals 2803c, 2803d, 2803e, 2803f, 2803u, and 2803v represent optical amplifiers, reference numerals 2803g, 2803h, 2803i, and 2803j represent optical terminators where the fiber loop is open, reference numerals 2803k and 2803l represent two-by-two fiber couplers, reference numerals 2803m, 2803n, 2803o, 2803p, 2803w, and 2803x represent optical amplifiers, and reference numerals 2803q, 2803r, 2803s, and 2803t represent optical terminators where the fiber loop is open. Reference numerals 2805, 2806, and 2807 represent access nodes which, with the remote node 2803, comprise the lower level ring network, reference numerals 2809, 2810, and 2811 represent ONU, reference numerals 2812 and 2813 represent optical fibers for protection, reference numerals 2806a, 2806b, 2806j, and 2806k represent two-by-two fiber couplers, reference numerals 2806c, 2806d, 2806e, 2806f, 2806l, 2806m, 2806n, 2806o, 2806p, and 2806q represent optical amplifiers, reference numeral 2806g represents an optical switch, reference numeral 2806h represents an optical coupler, reference numeral 2806i represents an optical coupler, and reference numerals 2806y and 2806z represent star couplers. Incidentally, the constitution of the center node 21h may be the same as, for example, the center node shown in FIG. 23.

One feature of this embodiment is that, star couplers which are not dependent on wavelength are used in distributing signals to the ONU belonging to the access nodes, and in multiplexing signals from the ONU. This is effective when the number of ONU varies from access node to access node. Furthermore, the ONU in this embodiment must be capable of selecting wavelengths. This embodiment also has the advantages that (i) there is no switching at the remote nodes when the fiber becomes severed, and (ii) the optical signal is not electrically processed at the nodes (offices) provided between the ONU and the center node. Incidentally, the operations in the cases where the optical cable becomes severed at the points AA' and BB' (not shown in FIG. 28) are the same as that already described in the second embodiment.

According to the embodiments described above, it is possible to reduce initial expenditure when realizing a large-capacity access service by using ONU. Further, when increasing the number of ONU, only the transmission apparatuses at the center node need be increased, achieving an easily expandable network.

What is claimed is:

1. A node apparatus in an optical wavelength division multiplexing network having a multi-level structure, said node apparatus being connected to a lowest level network and a network higher than the lowest level network (hereinafter referred to as a "higher level network"), the higher level network including a bidirectional primary fiber path and a bidirectional protection fiber path, the lowest level network including a plurality of optical network units (ONUs) connected thereto, each ONU being allocated with a respective wavelength and capable of de-multiplexing, said node apparatus comprising:

a first passive optical component configured to receive and branch optical signals from the bidirectional primary fiber path, and couple optical signals received from the lowest level network to the bidirectional primary fiber path;

a second passive optical component configured to receive and branch optical signals from the bidirectional protection fiber path, and couple optical signals received from the lowest level network to the bidirectional protection fiber path;

an optical switch configured to select and output optical signals received from the bidirectional primary fiber path if the optical signals are being input from the bidirectional primary fiber path, and select and output optical signals received from the bidirectional protection fiber path if severance of the optical signals is detected in input from the bidirectional primary fiber path;

an optical divider configured to divide optical signals received from the ONUs into a plurality of directions, the divided optical signals being coupled to the first and second passive optical components;

bidirectional optical amplifiers configured to amplify the optical signals input to and output from said first and second passive optical components;

an optical star coupler connected to the ONUs; and an optical circulator provided between said optical switch and said optical star coupler, said optical circulator being coupled to said optical divider, wherein said node apparatus provides an optical communication path between the higher level network and the lowest level network without converting the optical signals into electrical signals.

2. A node apparatus in an optical wavelength division multiplexing network having a multi-level structure, said node apparatus being connected to a highest level network, the highest level network including a primary optical fiber path and a protection optical fiber path, said node apparatus being a multiplexing destination of traffic from lower level networks, said node apparatus comprising:

a first optical de-multiplexer configured to receive optical signals from the primary optical fiber path and de-multiplex the received optical signals into first de-multiplexed optical signals having respective wavelengths;

a second optical de-multiplexer configured to receive optical signals from the protection optical fiber path and de-multiplex the received optical signals into second de-multiplexed optical signals having respective wavelengths;

a signal selection circuit coupled to said first and second optical de-multiplexers, said signal selection circuit configured to select, for each wavelength, either one of the first or second de-multiplexed optical signal based on severance of received optical signals, and output the selected de-multiplexed optical signals as de-multiplexed electrical signals;

an signal processing circuit coupled to said signal selection circuit, said signal processing circuit configured to receive and electrically process the de-multiplexed electrical signals, and output processed de-multiplexed electrical signals as processed de-multiplexed optical signals in two directions;

a first optical multiplexer configured to receive and multiplex the processed de-multiplexed optical signals in a first direction and output to the primary optical fiber path; and a second optical multiplexer configured to receive and multiplex the processed de-multiplexed optical signals in a second direction and output the protection optical fiber path.

3. The node apparatus of claim 2, wherein said signal selection circuit comprising:

a plurality of first optical receivers coupled to said first de-multiplexer, said first optical receivers configured to convert the first de-multiplexed optical signals into first de-multiplexed electrical signals;

a plurality of second optical receivers coupled to said second de-multiplexers, said second optical receivers configured to convert the second de-multiplexed optical signals into second de-multiplexed electrical signals; and a plurality of selectors coupled to said first and second optical receivers, said selectors configured to selectively output either one of the first or second de-multiplexed electrical signals to said signal processing circuit.

4. The node apparatus of claim 2, wherein said signal processing circuit comprising:

a signal termination section configured to perform predetermined electrical processing and output processed electrical signals in two directions; and a plurality of optical senders coupled to said signal termination section, configured to convert the processed electrical signals into corresponding optical signals.

5. The node apparatus of claim 2, wherein said signal selection circuit comprising:

a plurality of optical switches coupled to said first and second de-multiplexers, said optical switches configured to selectively output either one of the first or second de-multiplexed optical signals; and a plurality of optical receivers each coupled to a corresponding one of said optical switches, said optical receivers configured to convert the selected de-multiplexed optical signals into a corresponding electrical signals.

6. The node apparatus of claim 2, wherein said signal processing circuit comprising:

a signal termination section configured to perform predetermined electrical processing;

a plurality of optical senders coupled to said signal termination section, configured to convert processed electrical signals into corresponding processed optical signals; and a plurality of optical dividers configured to divide the processed optical signals into two directions.

* * * * *